US012471170B2

(12) United States Patent
Akl et al.

(10) Patent No.: US 12,471,170 B2
(45) Date of Patent: Nov. 11, 2025

(54) INTER-DONOR TOPOLOGY DISCOVERY IN INTEGRATED ACCESS AND BACKHAUL (IAB)

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 946 days.

(21) Appl. No.: 17/321,234

(22) Filed: May 14, 2021

(65) Prior Publication Data

US 2022/0369183 A1    Nov. 17, 2022

(51) Int. Cl.
*H04W 76/27* (2018.01)
*H04W 36/08* (2009.01)
*H04W 84/04* (2009.01)
*H04W 40/36* (2009.01)
*H04W 76/19* (2018.01)

(52) U.S. Cl.
CPC ......... *H04W 76/27* (2018.02); *H04W 36/087* (2023.05); *H04W 84/047* (2013.01); *H04W 40/36* (2013.01); *H04W 76/19* (2018.02)

(58) Field of Classification Search
CPC .......... H04W 36/0055; H04W 36/087; H04W 36/08; H04W 36/305; H04W 76/19; H04W 84/047; H04W 92/12; H04W 40/36
See application file for complete search history.

(56) References Cited

U.S. PATENT DOCUMENTS

| 2023/0180090 A1* | 6/2023 | Zhu ........................ H04W 76/19 370/331 |
| 2023/0254729 A1* | 8/2023 | Jia ...................... H04W 28/0247 |
| 2024/0073768 A1* | 2/2024 | Liu ...................... H04W 36/304 |

OTHER PUBLICATIONS

International Search Report and Written Opinion—PCT/US2022/017530—ISA/EPO—Jun. 21, 2022.

(Continued)

*Primary Examiner* — Nam T Huynh
(74) *Attorney, Agent, or Firm* — Patterson & Sheridan LLP

(57) ABSTRACT

Aspects of the present disclosure provide techniques for inter-donor topology discovery in an Integrated Access and Backhaul (IAB) network during migration of an IAB-node. A method that may be performed by a first IAB-donor includes establishing a first signaling connection with an IAB-node, receiving an indication that the IAB-node has a second signaling connection with a second IAB-donor, and in response to receiving the indication: transferring, to the second IAB-donor, information related to the IAB-node, re-establishing traffic between the first IAB-donor and the IAB-node via a topology of the second IAB-donor, or any combination thereof.

29 Claims, 14 Drawing Sheets

(56) References Cited

OTHER PUBLICATIONS

Kddi Corporation: "Considerations on Inter-Donor IAB Migration", 3GPP Draft, 3GPP TSG-RAN3 WG Meeting #112-e, R3-212122, 3rd Generation Partnership Project (3GPP), Mobile Competence Centre, 650, Route Des Lucioles, F-06921 Sophia-Antipolis Cedex, France, vol. RAN WG3, No. Online, May 17, 2021-May 28, 2021, May 7, 2021 (May 7, 2021), XP052002316, 22 Pages.

Zte, et al., "Further Considerations on Inter-Donor IAB Node Migration Procedure", 3GPP Draft, 3GPP TSG-RAN WG3 #111-e, R3-210207, 3rd Generation Partnership Project (3GPP), Mobile Competence Centre, 650, Route Des Lucioles, F-06921 Sophia-Antipolis Cedex, France, vol. RAN WG3, No. Online, Jan. 25, 2021-Feb. 4, 2021, Jan. 15, 2021 (Jan. 15, 2021), XP051974940, 20 Pages.

Zte: "Further Considerations on Inter-Donor Migration", 3GPP Draft, 3GPP TSG-RAN WG3 #112-e, R3-212037, 3rd Generation Partnership Project (3GPP), Mobile Competence Centre, 650, Route Des Lucioles, F-06921 Sophia-Antipolis Cedex, France, vol. Ran WG3, No. Online, May 17, 2021-May 28, 2021, May 7, 2021 (May 7, 2021), XP052002281, 12 Pages.

\* cited by examiner

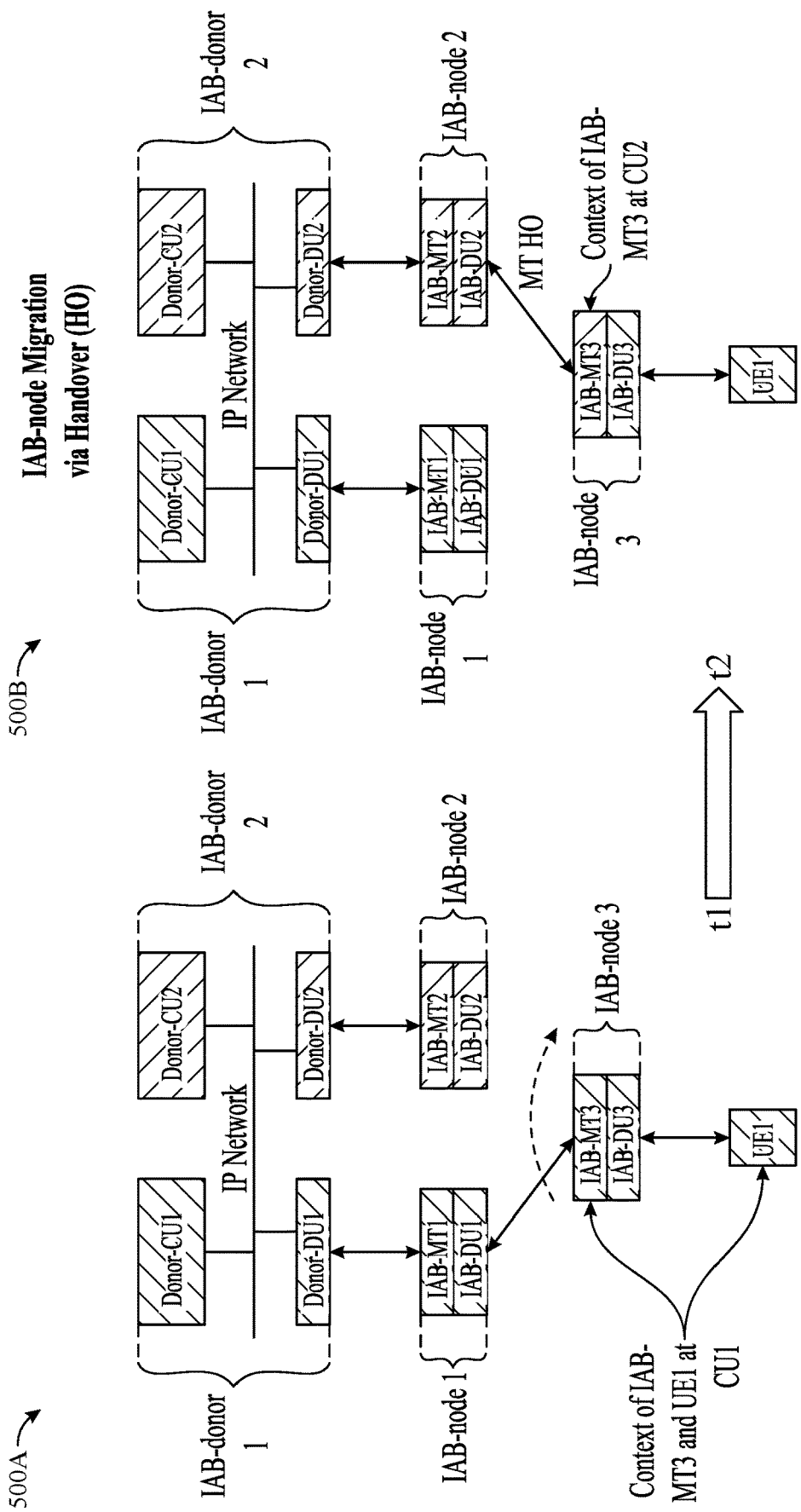

INTER-DONOR TOPOLOGY DISCOVERY IN INTEGRATED ACCESS AND BACKHAUL (IAB)

INTRODUCTION

Aspects of the present disclosure relate to wireless communications, and more particularly, to techniques for inter-donor topology discovery in an Integrated Access and Backhaul (IAB) network during migration of an IAB-node.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink (DL) channels (e.g., for transmissions from a BS or DU to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the DL and on the UL. To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved communications between wireless communication devices.

Certain aspects provide a method for wireless communications by an integrated access and backhaul (IAB)-node. The method generally includes establishing a first signaling connection with a first IAB-donor, establishing a second signaling connection with a second IAB-donor, and transmitting an indication to the second IAB-donor that the IAB-node has a first signaling connection to the first IAB-donor.

Certain aspects of the present disclosure are directed to an apparatus for wireless communication by an IAB-node. The apparatus generally includes at least one processor; and a memory coupled to the at least one processor, the memory including instructions executable by the at least one processor to cause the apparatus to establish a first signaling connection with a first IAB-donor, establish a second signaling connection with a second IAB-donor, and transmit an indication to the second IAB-donor that the IAB-node has a first signaling connection to the first IAB-donor.

Certain aspects of the present disclosure are directed to an apparatus for wireless communication by an IAB-node. The apparatus generally includes means for establishing a first signaling connection with a first IAB-donor, means for establishing a second signaling connection with a second IAB-donor, and means for transmitting an indication to the second IAB-donor that the IAB-node has a first signaling connection to the first IAB-donor.

Certain aspects of the present disclosure are directed to a computer readable medium having instructions stored thereon for establishing a first signaling connection with a first IAB-donor, establishing a second signaling connection with a second IAB-donor, and transmitting an indication to the second IAB-donor that the IAB-node has a first signaling connection to the first IAB-donor.

Certain aspects provide a method for wireless communications by a first IAB-donor. The method generally includes establishing a first signaling connection with an IAB-node, receiving an indication that the IAB-node has a second signaling connection with a second IAB-donor, and in response to receiving the indication: transferring, to the second IAB-donor, information related to the IAB-node, re-establishing traffic between the first IAB-donor and the IAB-node via a topology of the second IAB-donor, or any combination thereof.

Certain aspects of the present disclosure are directed to an apparatus for wireless communication by a first IAB-donor. The apparatus generally includes at least one processor; and a memory coupled to the at least one processor, the memory including instructions executable by the at least one processor to cause the apparatus to: establish a first signaling connection with an IAB-node, receive an indication that the IAB-node has a second signaling connection with a second IAB-donor, and in response to receiving the indication: transfer, to the second IAB-donor, information related to the IAB-node, re-establish traffic between the first IAB-donor and the IAB-node via a topology of the second IAB-donor, or any combination thereof.

Certain aspects of the present disclosure are directed to an apparatus for wireless communication by a first IAB-donor. The apparatus generally includes means for establishing a first signaling connection with an IAB-node, means for receiving an indication that the IAB-node has a second signaling connection with a second IAB-donor, and in response to receiving the indication: means for transferring, to the second IAB-donor, information related to the IAB-node, means for re-establishing traffic between the first IAB-donor and the IAB-node via a topology of the second IAB-donor, or any combination thereof.

Certain aspects of the present disclosure are directed to a computer readable medium having instructions stored thereon for establishing a first signaling connection with an IAB-node, receiving an indication that the IAB-node has a second signaling connection with a second IAB-donor, and in response to receiving the indication: transferring, to the second IAB-donor, information related to the IAB-node, re-establishing traffic between the first IAB-donor and the IAB-node via a topology of the second IAB-donor, or any combination thereof.

Certain aspects provide a method for wireless communications by a first IAB-donor. The method generally includes establishing a first signaling connection with an IAB-node, receiving, from the IAB-node, a first indication that the IAB-node has a second signaling connection with a second IAB-donor, and transmitting, to the second IAB-donor, a second indication that the first IAB-donor has the first signaling connection with the IAB-node.

Certain aspects of the present disclosure are directed to an apparatus for wireless communication by a first IAB-donor. The apparatus generally includes at least one processor; and a memory coupled to the at least one processor, the memory including instructions executable by the at least one processor to cause the apparatus to: establish a first signaling connection with an IAB-node, receive, from the IAB-node, a first indication that the IAB-node has a second signaling connection with a second IAB-donor, and transmit, to the second IAB-donor, a second indication that the first IAB-donor has the first signaling connection with the IAB-node.

Certain aspects of the present disclosure are directed to an apparatus for wireless communication by a first IAB-donor. The apparatus generally includes means for establishing a first signaling connection with an IAB-node, means for receiving, from the IAB-node, a first indication that the IAB-node has a second signaling connection with a second IAB-donor, and means for transmitting, to the second IAB-donor, a second indication that the first IAB-donor has the first signaling connection with the IAB-node.

Certain aspects of the present disclosure are directed to a computer readable medium having instructions stored thereon for establishing a first signaling connection with an IAB-node, receiving, from the IAB-node, a first indication that the IAB-node has a second signaling connection with a second IAB-donor, and transmitting, to the second IAB-donor, a second indication that the first IAB-donor has the first signaling connection with the IAB-node.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and the description may admit to other equally effective aspects.

FIGS. 5A and 5B are diagrams illustrating an example migration of a mobile termination (MT) component of an IAB-node via a handover (HO) procedure, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
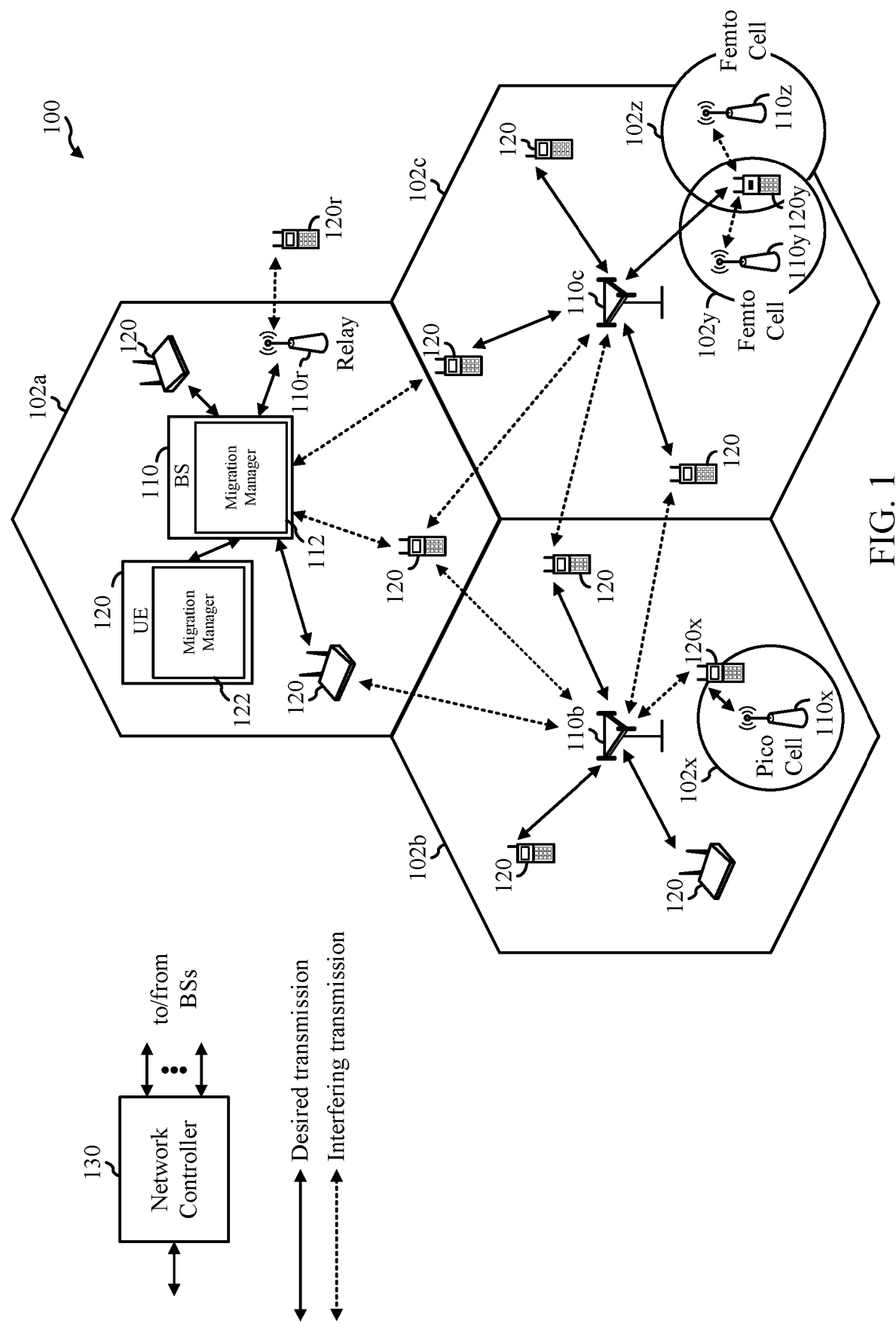
FIG. 1 is a block diagram conceptually illustrating an example wireless communications system, in accordance with certain aspects of the present disclosure.

Aspects of the present disclosure provide techniques for inter-donor topology discovery in an Integrated Access and Backhaul (IAB) network during migration of an IAB-node. In some cases, a mobile termination (MT) and distributed unit (DU) component (also referred to herein as a MT or DU part) of an IAB-node may not be collocated. In other words, a context of the MT component of the IAB-node may be maintained at a first IAB-donor, while a context of the DU component of the IAB-node may be maintained at a second IAB-donor. In such a scenario, when the MT component of the IAB-node migrates, due to handover (HO) or link re-establishment, the second IAB-donor may be blind to (e.g., unaware of) a context transfer of the MT component from the first IAB-donor to another IAB-donor for which the MT establishes a new signaling connection with. It may be important for IAB-donor to have knowledge of the transfer to be able to continue communicating with the DU component of the IAB-node (as well as its descendants) and, in some cases, to be able to initiate a context transfer for these entities.

Aspects of the present disclosure provide techniques for discovery of donor topology among IAB-donors in an IAB network architecture to inform an (unaware) IAB-donor of the transfer. In some cases, the IAB-node itself may inform the second IAB-donor of the transfer. In some other cases, another IAB-donor having a new connection to the MT component of the IAB-node may inform the second IAB-donor of the transfer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Example Wireless Communications System

FIG. 1 illustrates an example wireless communication network 100 in which aspects of the present disclosure may be performed. As shown in FIG. 1, the wireless communication network 100 may include an Integrated Access and Backhaul (IAB)-node (implemented as user equipment (UE) 120a or base station (BS) 110a) configured to perform operations 800 of FIG. 8. Similarly, the wireless communication network 100 may include an IAB-donor (implemented as BS 110a) configured to perform operations 900 of FIG. 9 or operations 1000 of FIG. 10 to assist an IAB-node performing operations 800 of FIG. 8. For example, the IAB-node, implemented as UE 120a, includes a Migration Manager 122 and the IAB-node or IAB-donor, implemented as BS 110a, includes a Migration Manager 112. The Migration Manager 122 and the Migration Manager 112 may be configured to perform inter-donor topology discovery during migration of an IAB-node, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS may be a station that communicates with UEs. Each BS 110 may provide communication coverage for a particular geographic area, sometimes referred to as a "cell". In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio (NR) BS, 5G NB, access point (AP), or transmission reception point (TRP) may be interchangeable. In some examples, a cell may not necessarily be stationary, and the geographic area of the cell may move according to the location of a mobile BS. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations (e.g., relay station 110r), also referred to as relays or the like, that receive a transmission of data and/or other information from an upstream station (e.g., a BS 110 or a UE 120r) and sends a transmission of the data and/or other information to a downstream station (e.g., a UE 120 or a BS 110), or that relays transmissions between UEs 120, to facilitate communication between devices. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink (DL) and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the UL and DL and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the DL and/or UL. A finely dashed line with double arrows indicates interfering transmissions between a UE and a BS.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
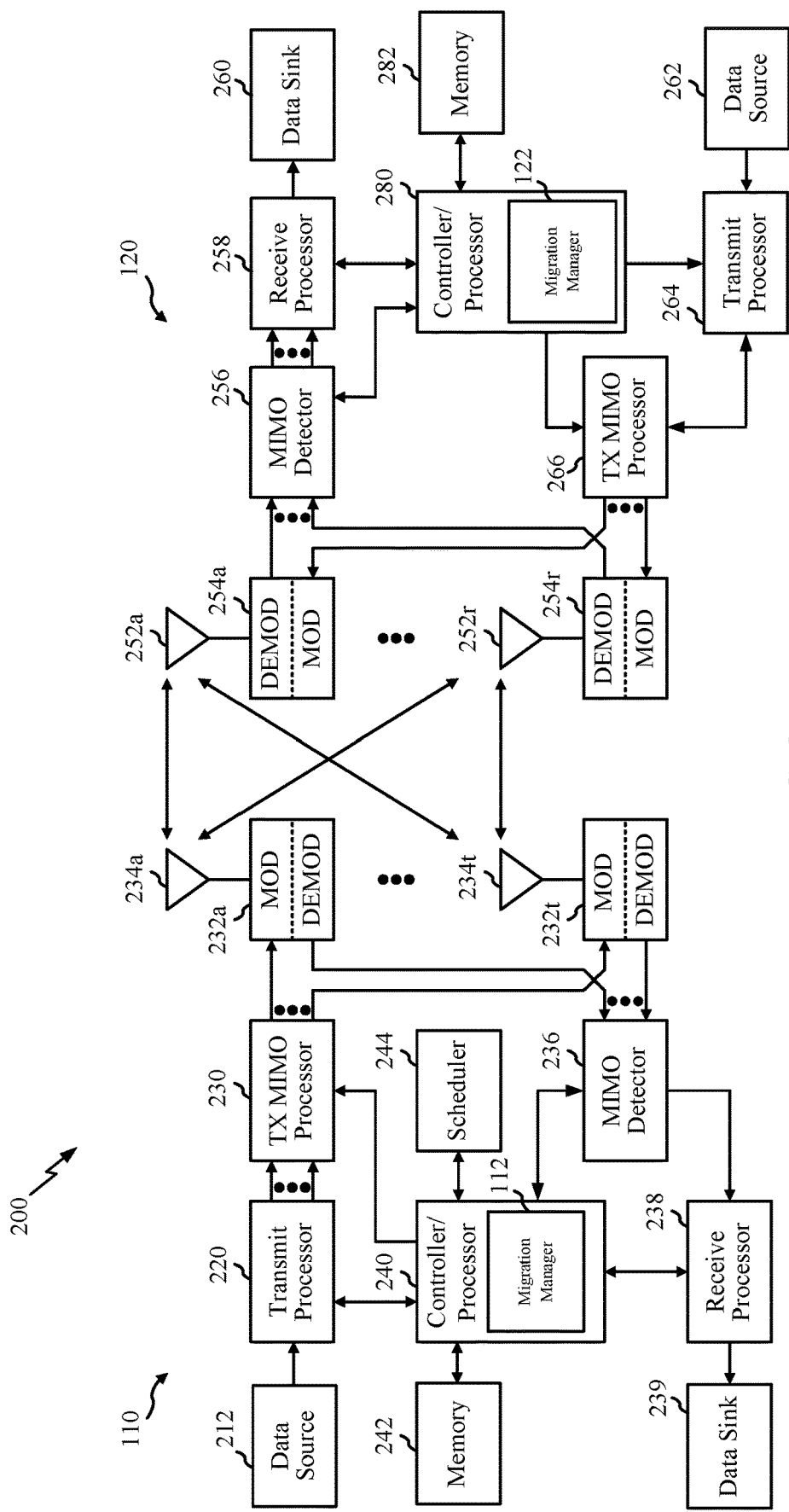
FIG. 2 is a block diagram conceptually illustrating a design of an example a base station (BS) and user equipment (UE), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein.

It should be noted that although FIG. 2 illustrates UE 120 communicating with a BS 110, an IAB-node may similarly communicate with a an IAB-donor (or other network entity) and each may (e.g., respectively) have similar components as discussed with respect to FIG. 2. In other words, an IAB-node may have similar components as UE 120 and may be configured to perform operations 800 of FIG. 8, while an IAB-donor (or other network entity) may have similar components as BS 110 and may be configured to perform operations 900 of FIG. 9 or operations 1000 of FIG. 10.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a DL signal. DL signals from modulators 232a-232t may be transmitted via the antennas 234a-234t, respectively.

At the UE 120, the antennas 252a-252r may receive DL signals from the BS 110 or an IAB-donor, or an IAB-node may receive DL signals from an IAB-donor, and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the UL, at UE 120 or an IAB-node, a transmit processor 264 may receive and process data (e.g., for the physical uplink shared channel (PUSCH) or the PSSCH) from a data source 262 and control information (e.g., for the physical uplink control channel (PUCCH) or the PSCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110 or an IAB-donor.

At the BS 110, or an IAB-donor, the UL signals from the UE 120, or an IAB-node, may be received by the antennas 234, processed by the modulators 232, detected by a MIMO detector 236 if applicable, and further processed by a receive processor 238 to obtain decoded data and control information sent by the UE 120, or IAB-node. The receive processor 238 may provide the decoded data to a data sink 239 and the decoded control information to the controller/processor 240.

The controllers/processors 240 and 280 may direct the operation at the BS 110 and the UE 120, respectively (or at the IAB-donor and IAB-node, respectively). The controller/processor 240 and/or other processors and modules at the BS 110 may perform or direct the execution of processes for the techniques described herein. The controller/processor 280 and/or other processors and modules at the UE 120 may perform or direct the execution of processes for the techniques described herein. The memories 242 and 282 may store data and program codes for BS 110 and UE 120, respectively. A scheduler 244 may schedule UEs for data transmission on the DL and/or UL.

Figure 3:
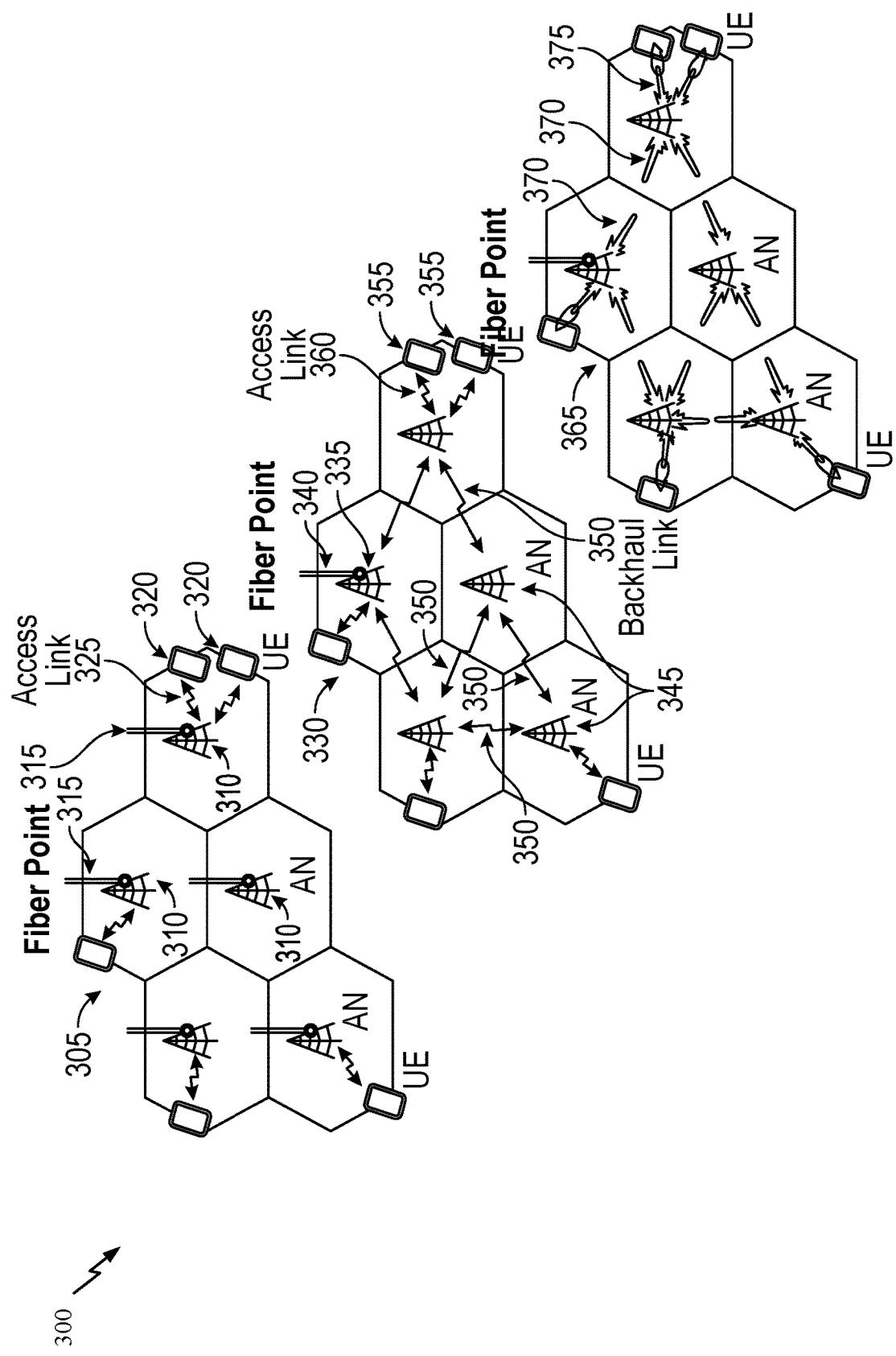
FIG. 3 is a diagram illustrating examples of radio access networks (RANs), in accordance with certain aspects of the present disclosure.

FIG. 3 is a diagram illustrating examples of radio access networks (RANs), in accordance with certain aspects of the disclosure.

As shown by reference number 305, a traditional (for example, 3G, 4G, LTE) radio access network may include multiple BSs 310 (for example, access nodes (ANs)), where each BS 310 communicates with a core network via a wired backhaul link 315, such as a fiber connection. A BS 310 may communicate with a UE 320 via an access link 325, which may be a wireless link. In some aspects, a BS 310 shown in FIG. 3 may correspond to a BS 110 shown in FIG. 1. Similarly, a UE 320 shown in FIG. 3 may correspond to a UE 120 shown in FIG. 1.

As shown by reference number 330, a RAN may include a wireless backhaul network. In some aspects or scenarios, a wireless backhaul network may sometimes be referred to as an IAB network. An IAB network may include multiple BSs and sometimes the BSs may be of differing types or have differing operational characteristics. For example, in some aspects, an IAB network may have at least one BS that is an anchor BS 335. The anchor BS may communicate with a core network via a wired backhaul link 340, such as a fiber connection. An anchor BS 335 may also be referred to as an IAB donor. Anchor BSs can be configured to communicate with other types of BSs or other communication devices (e.g. in a radio network or IAB network).

The IAB network may also include one or more non-anchor BSs 345. Non-anchor BSs may be referred to as relay BSs or IAB nodes. The non-anchor BS 345 may communicate directly with or indirectly with (for example, via one or more other non-anchor base stations 345) the anchor BS 335 via one or more backhaul links 350 to form a backhaul path to the core network for carrying backhaul traffic. Backhaul link 350 may be a wireless link. Anchor BS(s) 335 or non-anchor BS(s) 345 may communicate with one or more UEs 355 via access links 360, which may be wireless links for carrying access traffic. In some aspects, an anchor BS 335 or a non-anchor BS 345 shown in FIG. 3 may correspond to a BS 110 shown in FIG. 1. Similarly, a non-anchor BS 345 or UE 355 shown in FIG. 3 may correspond to a UE 120 shown in FIG. 1.

As shown by reference number 365, in some aspects, a RAN that includes an IAB network may utilize a variety of spectrum types. For example, an IAB network may utilize a variety of differing radio frequency bands. In a few particular examples and according to some aspects, millimeter wave (mmW) technology or directional communications can be utilized (for example, beamforming, precoding) for communications between BSs or UEs (for example, between two BSs, between two UEs, or between a BS and a UE). In additional or alternative aspects or examples, wireless backhaul links 370 between BSs may use mmWs to carry information or may be directed toward a target BS using beamforming, precoding. Similarly, the wireless access links 375 between a UE and a BS may use mmWs or may be directed toward a target wireless node (for example, a UE or a BS). In this way, inter-link interference may be reduced.

In some aspects, an IAB network may support a multi-hop network or a multi-hop wireless backhaul. Additionally, or alternatively, each node of an IAB network may use the same RAT (for example, 5G/NR). Additionally, or alternatively, nodes of an IAB network may share resources for access links and backhaul links, such as time resources, frequency resources, spatial resources. Furthermore, various architectures of IAB-nodes or IAB-donors may be supported.

In some aspects, an IAB-donor may include a central unit (CU) that configures IAB-nodes that access a core network via the IAB-donor and may include a distributed unit (DU) that schedules and communicates with child nodes of the IAB-donor.

In some aspects, an IAB-node may include a mobile termination component (MT) that is scheduled by and communicates with a DU of an IAB-donor, and may include a DU that schedules and communicates with child nodes of the IAB-node or UEs. A DU of an IAB-node may perform functions described in connection with BS 110 for that IAB-node, and an MT of an IAB-node may perform functions described in connection with UE 120 for that IAB-node.

Figure 4:
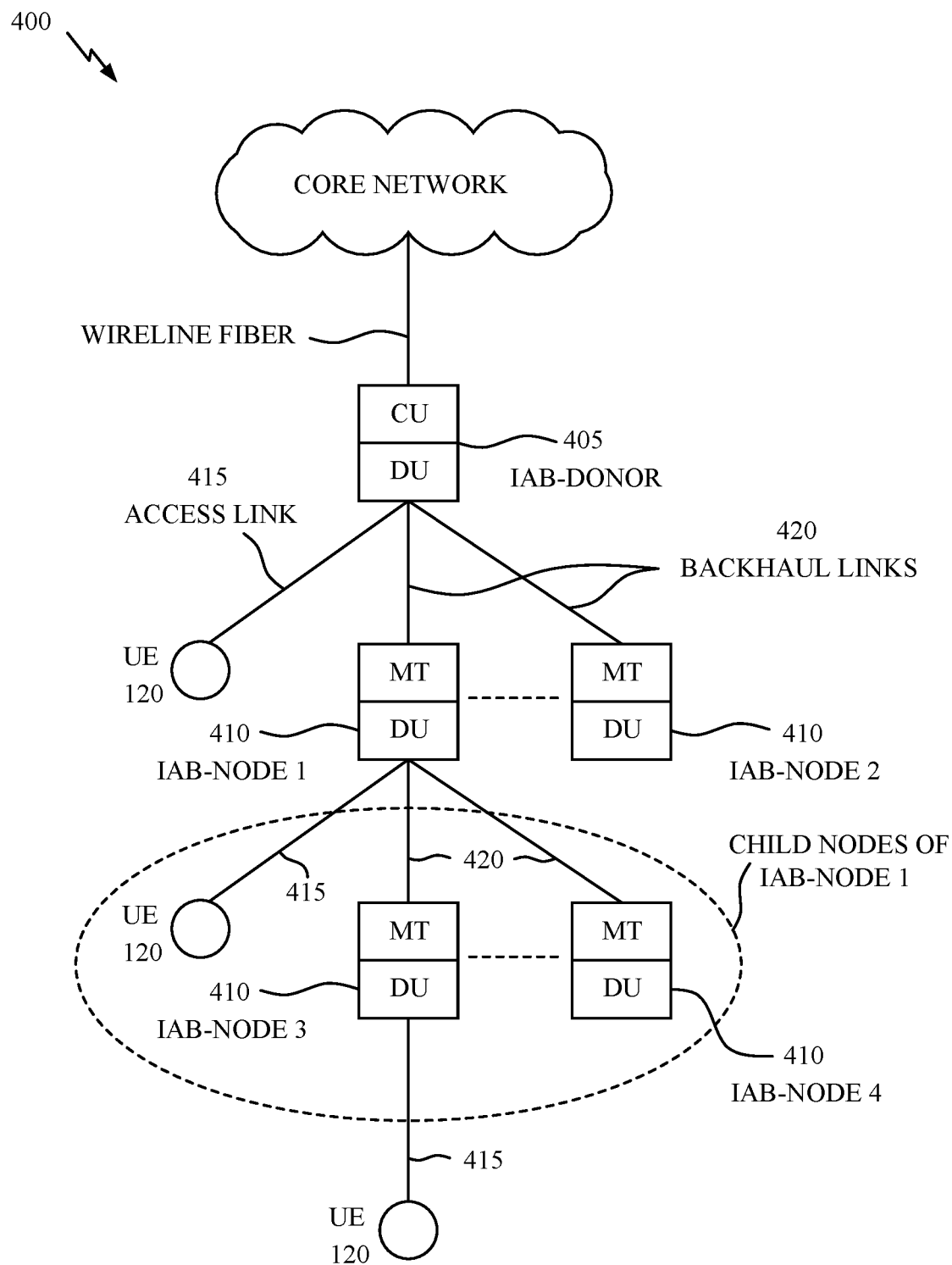
FIG. 4 is a diagram illustrating an example of an integrated access and backhaul (IAB) network architecture, in accordance with certain aspects of the present disclosure.

FIG. 4 is a diagram illustrating an example of an IAB network architecture, in accordance with certain aspects of the disclosure. As shown in FIG. 4, an IAB network may include an IAB-donor 405 that connects to a core network via a wired connection (for example, as a wireline fiber). For example, an Ng interface of an IAB-donor 405 may terminate at a core network. Additionally, or alternatively, an IAB-donor 405 may connect to one or more devices of the core network that provide a core access and mobility management function (AMF). In some aspects, an IAB-donor 405 may include a BS 110, such as an anchor BS, as described above in connection with FIG. 3. As shown, an IAB-donor 405 may include a CU, which may perform ANC functions or AMF functions. The CU may configure a DU of the IAB-donor 405 or may configure one or more IAB-nodes 410 (for example, an MT or a DU of an IAB-node 410) that connects to the core network via the IAB-donor 405. Thus, a CU of an IAB-donor 405 may control or configure the entire IAB network that connects to the core network via the IAB-donor 405, such as by using control messages or configuration messages (for example, a radio resource control (RRC) configuration message, an F1 application protocol (F1AP) message).

As described above, the IAB network may include IAB nodes 410 (shown as IAB nodes 1 through 4) that connect to the core network via the IAB donor 405. As shown, an IAB node 410 may include an MT and may include a DU. The MT of an IAB-node 410 (for example, a child IAB-node) may be controlled or scheduled by another IAB-node 410 (for example, a parent IAB-node) or by an IAB donor 405. The DU of an IAB-node 410 (for example, a parent IAB-node) may control or schedule other IAB-nodes 410 (for example, child nodes of the parent node) or UEs 120. Thus, a DU may be referred to as a scheduling node or a scheduling component, and an MT may be referred to as a scheduled node or a scheduled component. In some aspects, an IAB-donor 405 may include a DU and not an MT. That is, an IAB-donor 405 may configure, control, or schedule communications of IAB-nodes 410 or UEs 120. A UE 120 may include only an MT, and not a DU. That is, communications of a UE 120 may be controlled or scheduled by an IAB-donor 405 or an IAB-node 410 (for example, a parent node of the UE 120).

According to some aspects, certain nodes may be configured to participate in control/scheduling processes. For example in some aspects, when a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor 405 or an IAB node 410, and a child node may be an IAB node 410 or a UE 120. Communications of an MT of a child node may be controlled or scheduled by a parent node of the child node.

As further shown in FIG. 4, a link between a UE 120 and an IAB donor 405, or between a UE 120 and an IAB-node 410, may be referred to as an access link 415. Each access link 415 may be a wireless access link that provides a UE 120 with radio access to a core network via the IAB-donor 405, and potentially via one or more IAB-nodes 410.

As further shown in FIG. 4, a link between an IAB-donor 405 and an IAB-node 410, or between two IAB-nodes 410, may be referred to as a backhaul link 420. Each backhaul link 420 may be a wireless backhaul link that provides an IAB-node 410 with radio access to a core network via the IAB-donor 405, and potentially via one or more other intermediate IAB-nodes 410. In some aspects, a backhaul link 420 may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links 415 and backhaul links 420.

As described above, in a typical IAB network, IAB-nodes (for example, non-anchor BSs) are stationary (that is, non-moving). Next generation (5G) wireless networks have stated objectives to provide ultra-high data rate and support wide scope of application scenarios. IAB systems have been studied in 3GPP as one possible solution to help support these objectives.

As noted above, in IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., NR) and resources (e.g., frequency bands) for both access and backhaul links.

There are various possible architectures for IAB-nodes, including Layer 2 (L2) and Layer 3 (L3) solutions and a particular architecture deployed may depend on what layers of protocol stack are implemented in the intermediate nodes (IAB-nodes), for example, L2 relays may implement physical (PHY)/medium access control (MAC)/radio link control (RLC) layers.

Example Migration of an Integrated Access and Backhaul (IAB)-Node

Aspects of the present disclosure are related to procedures involving the migration of an Integrated Access and Backhaul (IAB)-node, and more specifically, procedures involving the migration of an IAB-node during an IAB-donor initiated handover (HO) procedure or an IAB-node initiated link re-establishment procedure.

IAB HO procedures may be used to HO an IAB-node from a source IAB-donor to a target IAB-donor. In some cases, HO procedures may be used where the quality of a link between a distributed unit (DU) component (also referred to herein as a part) of a parent IAB-node (also referred to herein as an IAB-DU) and a mobile termination component (MT) of a child IAB-node (also referred to herein as an IAB-MT) has become degraded. In some cases, HO procedures may be used for load balancing of other IAB-nodes in the IAB network. Re-establishment procedures may be used upon the detection of a link failure between the IAB-DU of a parent IAB-node and an IAB-MT of a child IAB-node.

Migration of an IAB-node may involve any combination of three parts, including (1) migration of the MT component of the IAB-node from a first IAB-donor (e.g., from a first IAB-donor's central unit (CU)) to a second IAB-donor (e.g., to a second IAB-donor's CU), (2) migration of the DU component of the IAB-node from a first IAB-donor to a second IAB-donor, and (3) migration of a descendant of an IAB-node, for example, a user equipment (UE) having a link connection to the DU component of the IAB-node, from the first IAB-donor to a second IAB-donor. As used herein, migration from a first IAB-donor to a second IAB-donor involves migration from a CU and DU component of the first IAB-donor to a CU and DU component of the second IAB-donor. As described herein, an IAB-donor may include a CU that configures IAB-nodes that access a core network via the IAB-donor and may include a DU that schedules and communicates with child nodes of the IAB-donor.

FIGS. 5A and 5B are diagrams illustrating an example migration of an MT component of an IAB-node via a HO procedure, in accordance with certain aspects of the present disclosure. As shown in FIG. 5A, in the IAB network architecture 500A, a first IAB-donor (e.g., IAB-donor 1) and a second IAB-donor (e.g., IAB-donor 2) may be connected to an internet protocol (IP) network. IAB-donor 1 may include a CU (e.g., Donor-CU1) which may configure a DU of IAB-donor 1 and one or more IAB-nodes. For example, Donor-CU1 may configure IAB-node 1 (including both IAB-MT1 and IAB-DU1) and IAB-node 3 (including both IAB-MT3 and IAB-DU3). Accordingly, a context for each of IAB-MT1, IAB-DU1, IAB-MT3, IAB-DU3, and the descendant of IAB-node 3 (e.g., UE1) may be maintained at Donor-CU1.

Similarly, IAB-donor 2 may include a CU (e.g., Donor-CU2) which may configure a DU of IAB-donor 2 and IAB-node 2 (including both IAB-MT2 and IAB-DU2). Thus, a context of each of IAB-MT2 and IAB-DU2 may be maintained at Donor-CU2.

As used herein, "context" refers to a control plane related configuration, a user plane related configuration, and/or how a connection to the core network for this node is managed. For example, a context of UE1 may include a physical configuration of the UE, a number of cells serving the UE, carrier aggregation (CA) information for the UE, quality of service (QoS) data quality, one or more services of the UE (e.g., voice calls and video downloading are different services which may require different treatment), a vertebrae of communication to the core network for the UE, etc.

At time t1, Donor-CU1 may initiate HO preparation of IAB-MT3 to Donor-CU2 for reasons discussed herein, including a degrading link between IAB-DU1 and IAB-MT3, load balancing, etc. Thus, as shown in the IAB network architecture 500B of FIG. 5B, at time t2, a signaling connection may be established between IAB-MT3 and Donor-CU2 at the completion of the HO process.

In this scenario, IAB-DU3 may still have a connection with Donor-CU1 that goes over the IP network. In other words, the context of IAB-DU3 and UE1 may remain at Donor-CU1, and UE1 may still be served on the same cell. However, context of IAB-MT3 may transfer from Donor-CU1 to Donor-CU2. Donor-CU1 may be aware of the IAB-MT3 context transfer from Donor-CU1 to Donor-CU2 because the HO procedure (e.g., MT transfer) was initiated by Donor-CU1. Accordingly, Donor-CU1 may have knowledge of the new signaling connection established between IAB-MT3 and IAB-DU2.

At time t2, Donor-CU1 may decide to take further action with respect to IAB-DU3 and UE1. In some cases, Donor-CU1 may decide to keep the context of IAB-DU3 and UE1 at Donor-CU1; therefore, Donor-CU1 may re-establish traffic (e.g., re-establish a backhauling path) between Donor-CU1 and IAB-DU3 and UE1 via a topology of the Donor-CU2. In other words, Donor-CU1 may re-establish connection with IAB-DU3 using connections that Donor-CU2 has established (e.g., links and nodes extending from Donor-CU2 to IAB-node 3). To re-establish traffic, Donor-CU1 and Donor-CU2 may exchange information, including at least one of QoS information, QoS mapping information, a backhaul adaptation protocol (BAP) configuration allocated to IAB-MT3, or an IP configuration allocated to IAB-MT3. In some other cases, Donor-CU1 may decide to transfer the context of each of IAB-DU3 and UE1 to Donor-CU2, as well, such that context of both the MT and DU component of IAB-node 3 is maintained at Donor-CU2, in addition to the context of the IAB-node 3's descendant (e.g., UE1). In either case, Donor-CU1 has the knowledge to complete the traffic re-establishment or context transfer.

Figures 6A, 6B:
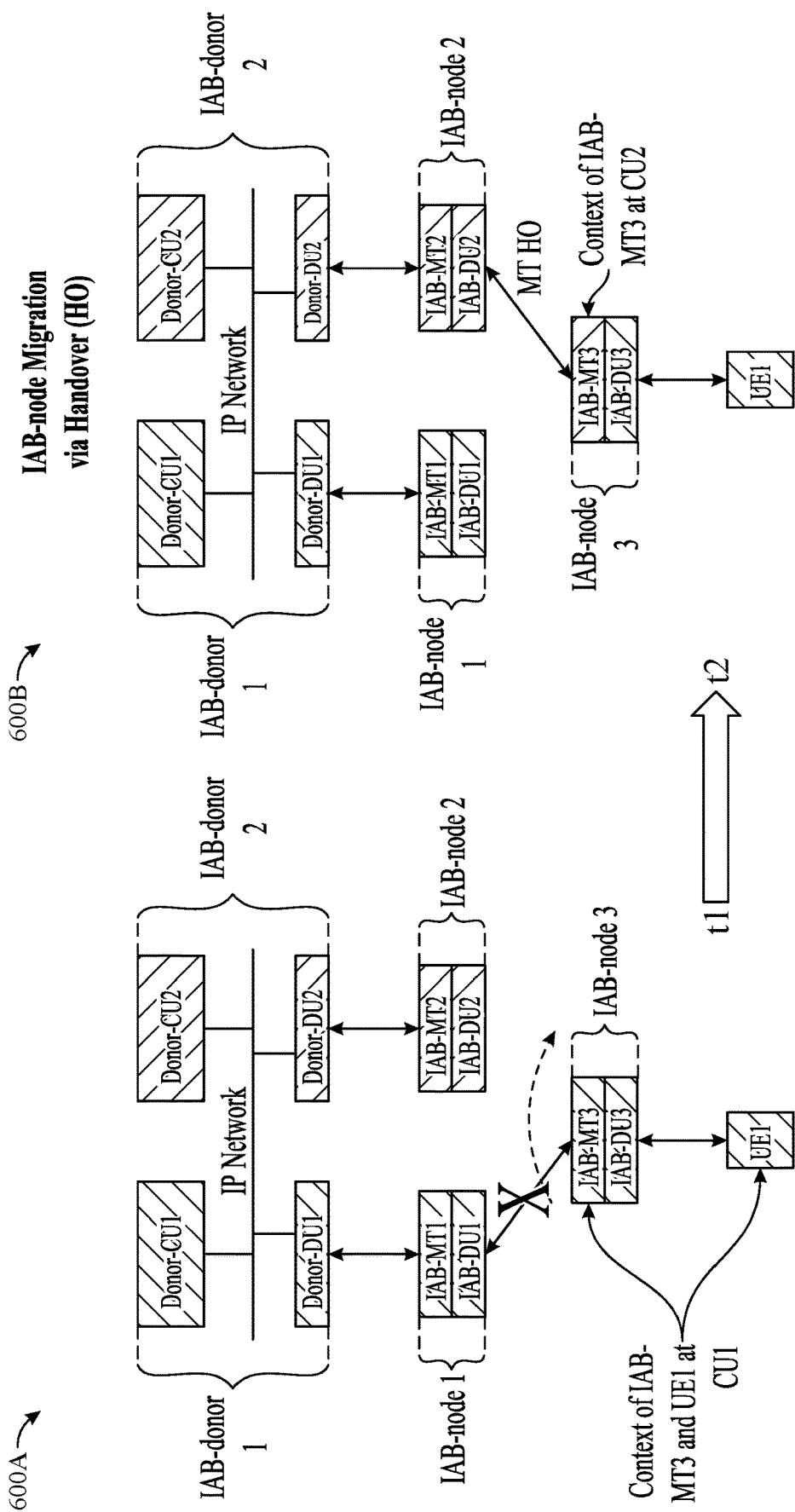
FIGS. 6A and 6B are diagrams illustrating an example migration of an MT component of an IAB-node via a link re-establishment procedure, in accordance with certain aspects of the present disclosure.

FIGS. 6A and 6B are diagrams illustrating an example migration of an MT component of an IAB-node via a link re-establishment procedure, in accordance with certain aspects of the present disclosure. Similar to FIG. 5A, as shown in the IAB network architecture 600A of FIG. 6A, IAB-donor 1 and IAB-donor 2 may be connected to an IP network. IAB-donor 1 may include Donor-CU1 which may configure IAB-MT1, IAB-DU1, IAB-MT3, and IAB-DU3. Accordingly, a context for each of IAB-MT1, IAB-DU1, IAB-MT3, IAB-DU3, and the descendant of IAB-DU3 (e.g., UE1) may be maintained at Donor-CU1. IAB-donor 2 may include a Donor-CU2 which may configure IAB-MT2 and IAB-DU2, thus, a context of each of IAB-MT2 and IAB-DU2 may be maintained at Donor-CU2.

Different from FIG. 5A, in which a HO procedure is initiated by Donor-CU1 to migrate IAB-MT3 to Donor-CU2, in FIG. 6A, a re-establishment procedure may be initiated by IAB-node 3 to migrate IAB-MT3 to Donor-CU2. As discussed herein, a re-establishment procedure may be initiated when a link connection fails. As shown in FIG. 6A, a link connection between IAB-MT3 and IAB-DU1 may be broken (e.g., meaning a connection no longer exists between IAB-MT3 and any IAB-donor in IAB network architecture 600A), thus, IAB-MT3 may initiate re-establishment. Because an MT component of an IAB-node is like a user equipment (UE), when the MT of the IAB-node experiences link failure, a signaling connection may be initiated and re-established by the MT. Accordingly, IAB-MT3 may initiate re-establishment of the connection.

At time t2, as shown in the IAB network architecture 600B of FIG. 6B, IAB-MT3 may establish a connection with Donor-CU2 during the re-establishment procedure by transmitting a re-establishment request to Donor-CU2. This re-establishment request may provide Donor-CU2 with enough information to determine that IAB-MT3 was originally served by Donor-CU1. Donor-CU2 may use this information to fetch context of IAB-MT3 from Donor-CU1. Donor-CU2 may become aware of the new signaling connection established between IAB-MT3 and Donor-CU2 when Donor-CU1 fetches context of IAB-MT3 from Donor-CU2.

Similar to the HO procedure illustrated in FIGS. 5A and 5B, in this re-establishment procedure, the context of IAB-DU3 and UE1 may remain at Donor-CU1. Accordingly, at time t2, Donor-CU1 may decide to either (1) keep the context of IAB-DU3 and UE1 at Donor-CU1 and re-establish traffic (e.g., re-establish a backhauling path) between Donor-CU1 and IAB-DU3 and UE1 via a topology of the Donor-CU2 or (2) transfer the context of each of IAB-DU3 and UE1 to Donor-CU2, such that context of both the MT and DU component of IAB-node 3 is maintained at Donor-CU2, in addition to the context of the IAB-node 3's descendant (e.g., UE1). In either case, Donor-CU1 may have the knowledge to complete the traffic re-establishment or context transfer given Donor-CU1 became aware of the connection between IAB-MT3 and Donor-CU2 when Donor-CU2 retrieved (e.g., fetched) context of IAB-MT3.

While FIGS. 5A, 5B, 6A, and 6B, illustrate a signaling connection with Donor-CU2 may be established during the HO or re-establishment procedure, any donor in the IAB network may establish a connection with the IAB-node during these procedures.

In some scenarios, however, prior to HO and re-establishment procedures, the MT and DU component of an IAB-node may not be collocated. In other words, a context of the MT component of the IAB-node may be maintained at a first IAB-donor, while a context of the DU component of the IAB-node may be maintained at a second IAB-donor. In such a scenario, when the MT component of the IAB-node migrates, due to HO or link re-establishment, the second IAB-donor may be blind to (e.g., unaware of) the context transfer of the MT component from the first IAB-donor to another IAB-donor for which the MT establishes a new signaling connection with.

Figures 7A, 7B:
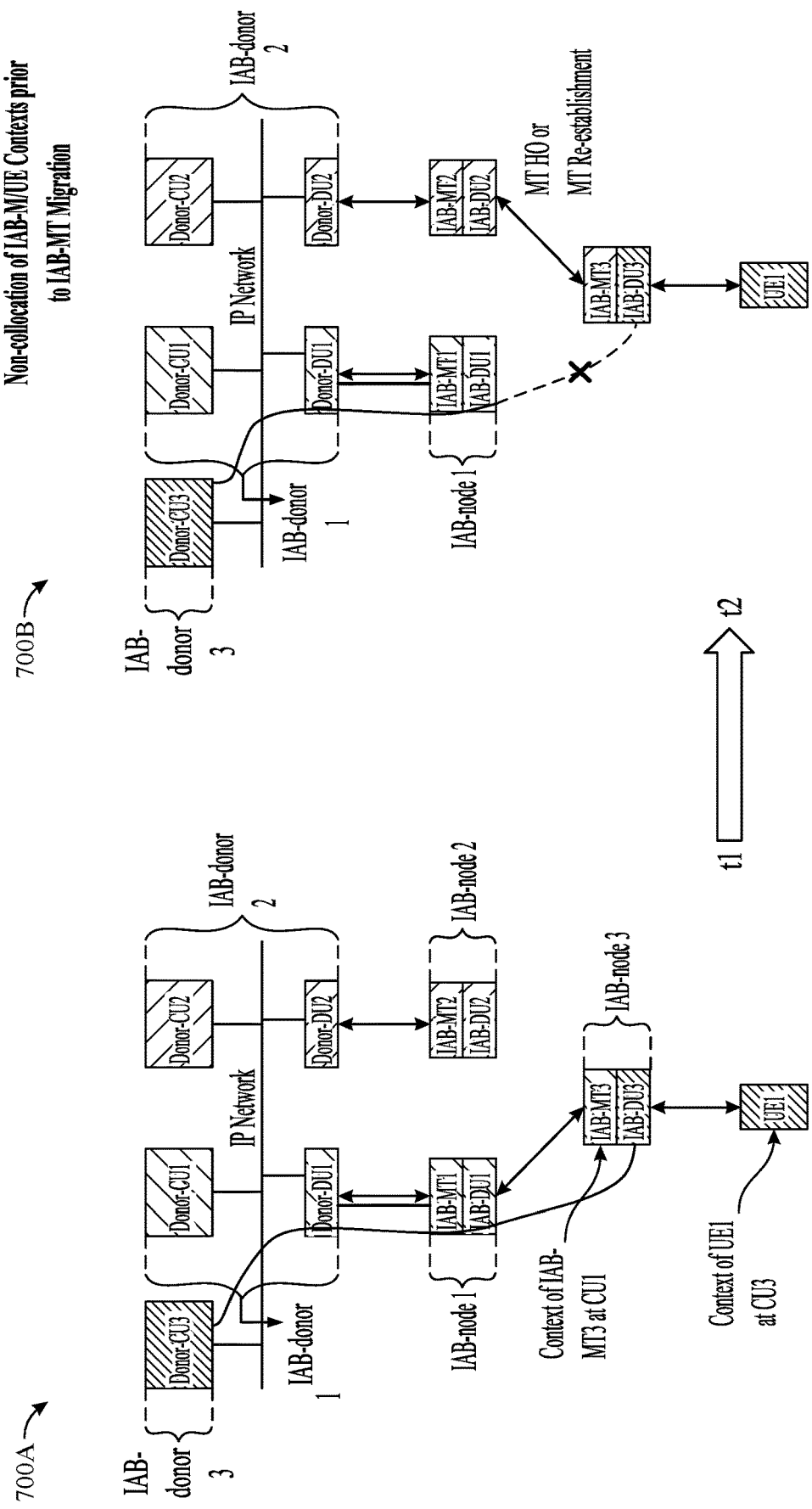
FIGS. 7A and 7B are diagrams illustrating an example migration of an MT component of an IAB-node when MT and distributed unit (DU) components of the IAB-node are not collocated prior to migration, in accordance with certain aspects of the present disclosure.

FIGS. 7A and 7B are diagrams illustrating an example migration of an MT component of an IAB-node when MT and DU components of the IAB-node are not collocated prior to migration, in accordance with certain aspects of the present disclosure. As shown in the IAB network architecture of 700A of FIG. 7A, IAB-donor 1, IAB-donor 2, and IAB-donor 3 may be connected to an IP network. IAB-donor 1 may include Donor-CU1 which may configure IAB-MT1, IAB-DU1, and IAB-MT3, and a context for each of IAB-MT1, IAB-DU1, and IAB-MT3 may be maintained at Donor-CU1. IAB-Donor 2 may include Donor-CU2 which may configure IAB-MT2 and IAB-DU2, and a context for each of IAB-MT2 and IAB-DU2 may be maintained at Donor-CU2. IAB-donor 3 may include Donor-CU3 which may configure IAB-DU3 and IAB-node 3's descendant, UE1, and a context for each of IAB-DU3 and UE1 may be maintained at Donor-CU3.

At steady state, time t1, the signaling connection between IAB-MT3 of IAB-node 3 and Donor-CU1 may be a radio resource control (RRC) connection to Donor-CU1, and the signaling connection between IAB-DU3 of IAB-node 3 may be a wireline interface connection using at least one of F1 control plane (F1-C) protocols or F1 application layer signaling protocols (F1-AP). In this case, Donor-CU3 may be using topology of Donor-CU1 to communicate with IAB-DU3 and UE1.

Because IAB-node 3 has more than one signaling connection with IAB-donors of the IAB network architecture 600A causing a context of IAB-MT3 to be maintained at Donor-CU1 and a context of IAB-DU3 to be maintained at Donor-CU2, MT and DU components of IAB-3 may be said to be non-collocated at time t1.

At time t1, HO or re-establishment procedures may be initiated for reasons discussed herein. Specifically, an HO procedure may be initiated by Donor-CU1, or a re-establishment procedure may be initiated by IAB-MT3. At time t2, IAB-MT3 may be migrated from Donor-CU1 to Donor-CU2, thereby establishing a signaling connection between IAB-MT3 and Donor-CU2 at the completion of the HO or re-establishment process.

Regardless of whether the migration of IAB-MT3 occurred as a result of HO initiated by Donor-CU1 or a re-establishment procedure initiated by IAB-MT3, Donor-CU3 may not know that the context of IAB-MT3 has changed. For example, assuming migration of IAB-MT3 occurred as a result of HO initiated by Donor-CU1, Donor CU1 may know of the transfer, given Donor-CU1 initiated the transfer, and Donor-CU2 may know of the transfer because Donor-CU2 is the donor for which IAB-MT3 established a new connection with; however, Donor-CU3 may not be involved in this process. As another example, assuming migration of IAB-MT3 occurred as a result of a re-establishment procedure initiated by IAB-MT3, Donor CU1 may acquire knowledge of the transfer when Donor-CU2 fetches context of IAB-MT3 from Donor-CU1 and Donor-CU2 may know of the transfer because Donor-CU2 is the donor for which IAB-MT3 established a new connection with; however, Donor-CU3 may not be involved in this process. In other words, Donor-CU3 may be blind to the migration.

It may be important for Donor-CU3 to have knowledge of the transfer to be able to continue communicating with IAB-DU3 and UE1. As described, prior to the migration, Donor-CU3 may be using topology of Donor-CU1 to communicate with IAB-DU3 and UE1. However, when IAB-MT3 establishes a new signaling connection with Donor-CU2, Donor-CU3 may no longer be able to use the topology of Donor-CU1 to communicate with IAB-DU3 and UE1. Without knowledge of the transfer, Donor-CU3 may not be able to re-establish traffic with these entities, and communication may be lost. Additionally, it may be important for Donor-CU3 to have knowledge of the transfer to allow Donor-CU3 to transfer context of IAB-DU3 and/or UE1 to Donor-CU1 should Donor-CU3 decide to initiate the context transfer for these entities.

Example Inter-Donor Topology Discovery in an Integrated Access and Backhaul (IAB)

Aspects of the present disclosure provide techniques for addressing scenarios where components of an Integrated Access and Backhaul (IAB)-node are non-collocated prior to migration of at least one component of the IAB-node. In some cases, a mobile termination (MT) component and distributed unit (DU) component of an IAB-node may not be collocated, thus, a context of the MT may be maintained at a first IAB-donor while a context of the DU may be maintained at a second IAB-donor. When the MT component of the IAB-node migrates, the second IAB-donor may be blind to (e.g., unaware of) the context transfer of the MT component from the first IAB-donor to another IAB-donor (e.g., blind to the establishment of a new signaling connection between the MT component and the other IAB-donor). Aspects of the present disclosure provide techniques for discovery of donor topology among IAB-donors in an IAB network architecture to inform the second IAB-donor of the transfer. In some cases, the IAB-node itself may inform the second IAB-donor of the transfer. In some other cases, the IAB-donor having a new connection to the MT component of the IAB-node may inform the second IAB-donor of the transfer.

Figure 8:
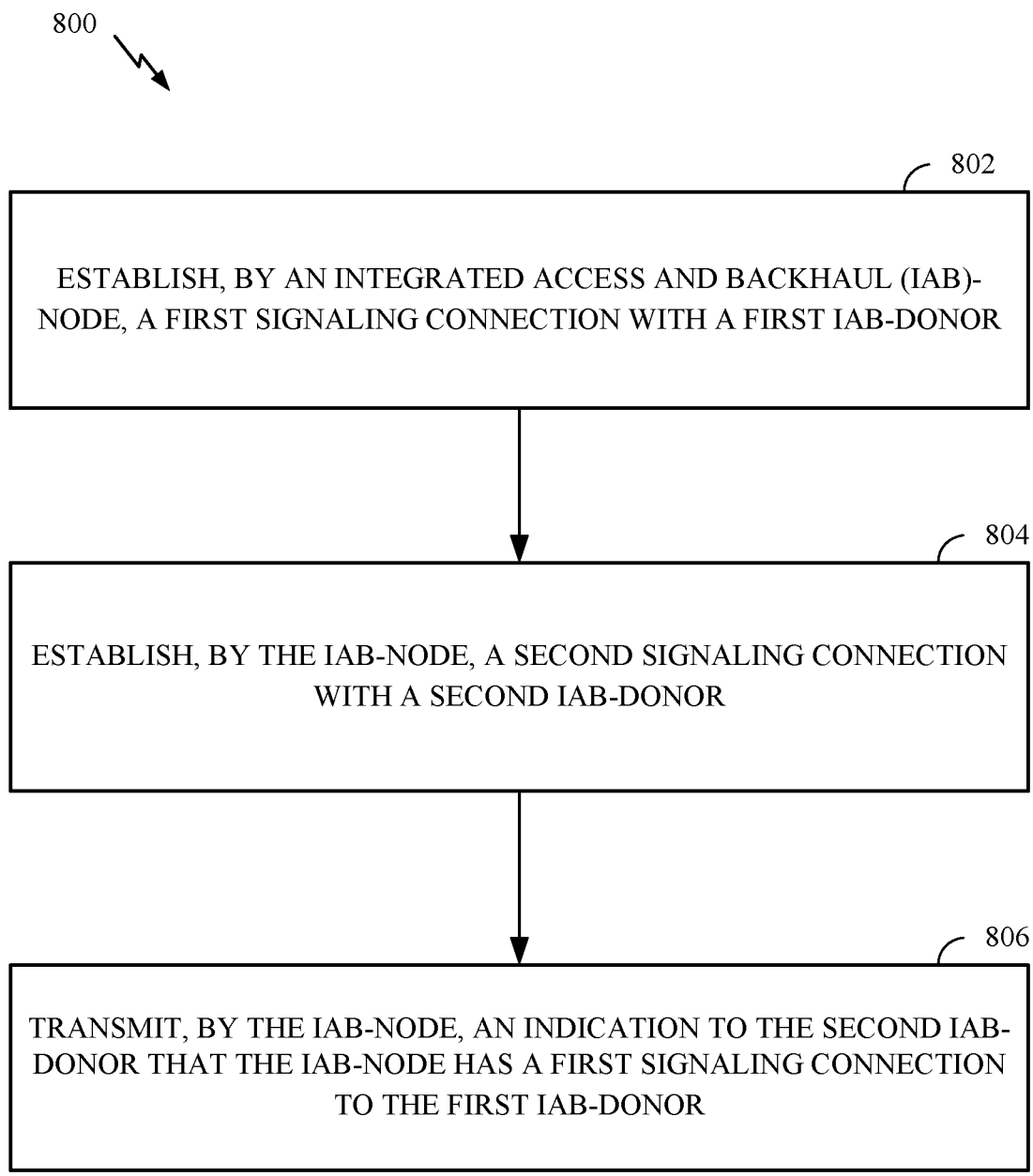
FIG. 8 is a flow diagram illustrating example operations for wireless communication by a node of an integrated access and backhaul (IAB) network, in accordance with certain aspects of the present disclosure.

FIG. 8 is a flow diagram illustrating example operations 800 for wireless communication by an IAB-node (e.g., having a DU and MT component), in accordance with certain aspects of the present disclosure. For example, operations 800 may be performed by an IAB-node having non-collocated MT and DU components.

Operations 800 may be implemented as software components that are executed and run on one or more processors (e.g., controller/processor 280 of FIG. 2). Further, the transmission and reception of signals by the IAB-node in operations 800 may be enabled, for example, by one or more antennas (e.g., antennas 252 of FIG. 2). In certain aspects, the transmission and/or reception of signals by the IAB-node may be implemented via a bus interface of one or more processors (e.g., controller/processor 258, 264, 266, and/or 280) obtaining and/or outputting signals.

Operations 800 may begin, at block 802, by the IAB-node establishing a first signaling connection with a first IAB-donor. The first signaling connection may be an RRC connection.

At block 804, the IAB-node establishes a second signaling connection with a second IAB-donor. The second signaling connection may be a wireline interface connection using at least one of: F1 control plane (F1-C) protocols or F1 application layer signaling protocols (F1-AP).

At block 806, the IAB-node transmits an indication to the second IAB-donor that the IAB-node has a first signaling connection to the first IAB-donor.

As an illustrative examples using the entities illustrated FIGS. 7A and 7B, at 802, IAB-node 3 may establish a first signaling connection with IAB-donor 2. At 804, IAB-node 3 may establish a second signaling connection with IAB-donor 3. At 806, IAB-node 3 may transmit an indication to IAB-donor 3 that IAB-node 3 has a first signaling connection to IAB-donor 2.

Figure 9:
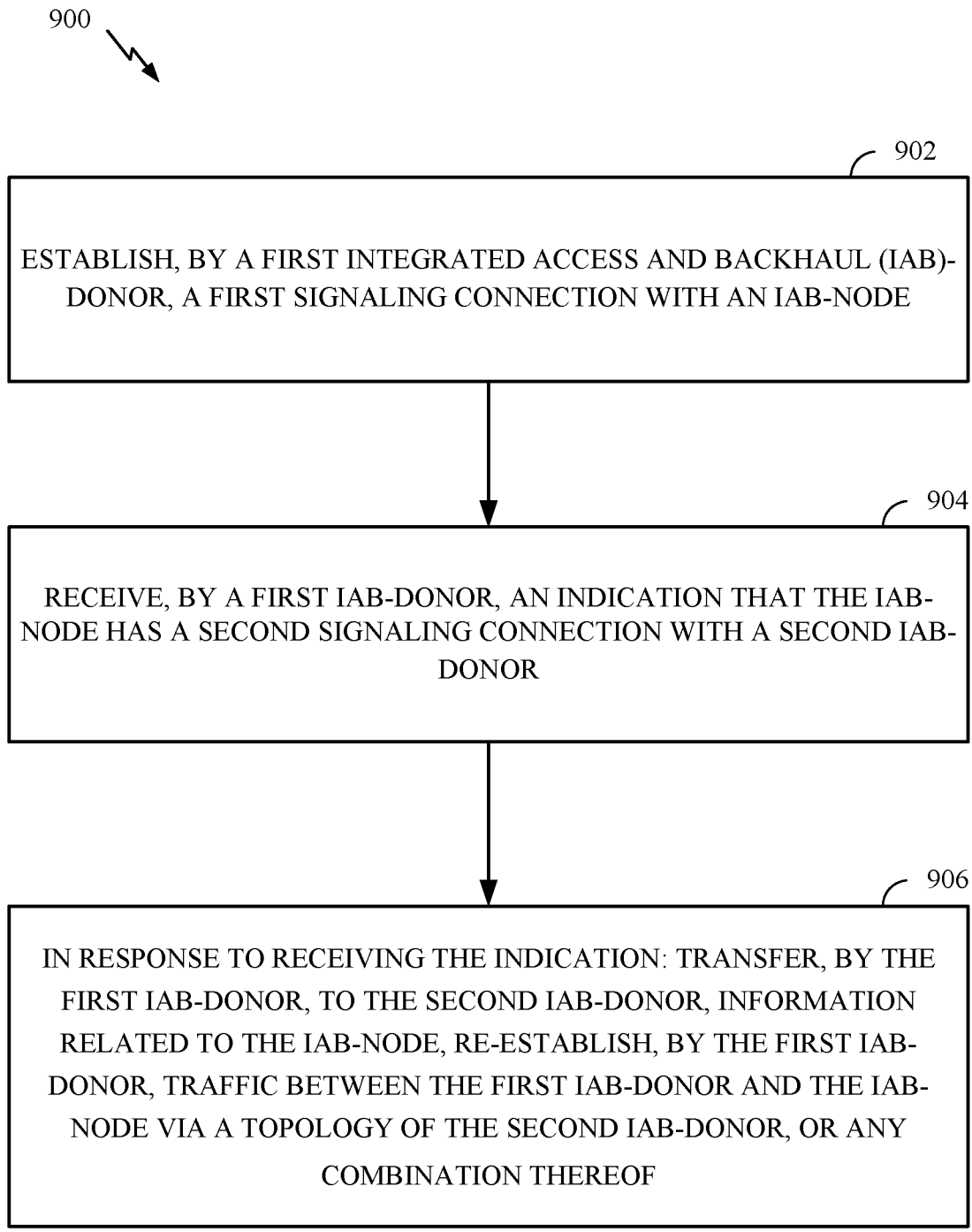
FIG. 9 is a flow diagram illustrating example operations for wireless communication by a donor node of an IAB network, in accordance with certain aspects of the present disclosure.

FIG. 9 is a flow diagram illustrating example operations 900 for wireless communication by a first IAB-donor (e.g., having a DU and central unit (CU) component), in accordance with certain aspects of the present disclosure. For example, operations 900 may be performed by IAB-donor 3 in FIGS. 7A and 7B. Operations 900 may be considered complementary to operations 800 of FIG. 8 performed by an IAB-node.

Operations 900 may be implemented as software components that are executed and run on one or more processors (e.g., controller/processor 240 of FIG. 2). Further, the transmission and reception of signals by the IAB-donor in operations 900 may be enabled, for example, by one or more antennas (e.g., antennas 234 of FIG. 2). In certain aspects, the transmission and/or reception of signals by the IAB-donor may be implemented via a bus interface of one or more processors (e.g., controller/processor 230, 220, 238, 240, and 244) obtaining and/or outputting signals.

Operations 900 may begin, at block 902, by the IAB-donor establishing a first signaling connection with an IAB-node. The first signaling connection may be a wireline interface connection using at least one of: F1-C or F1-AP protocols.

At block 904, the IAB-donor receives an indication that the IAB-node has a second signaling connection with a second IAB-donor. The IAB-donor may receive the indication from at least one of: the IAB-node or the second IAB-donor.

At block 906, the IAB-donor, in response to receiving the indication, transfers, to the second IAB-donor, information related to the IAB-node, re-establishes traffic between the first IAB-donor and the IAB-node via a topology of the second IAB-donor, or any combination thereof.

As an illustrative example using the entities illustrated FIGS. 7A and 7B, at 902, IAB-donor 3 may establish a first signaling connection with IAB-node 3. At 904, IAB-donor 3 may receive an indication that IAB-node 3 has a second signaling connection with IAB-donor 2. At 906, in response to receiving the indication, IAB-donor 3 may transfer, to IAB-donor 2, information related to IAB-node 3, re-establish traffic between the IAB-donor 3 and IAB-node 3 via a topology of IAB-donor 2, or any combination thereof.

Figure 10:
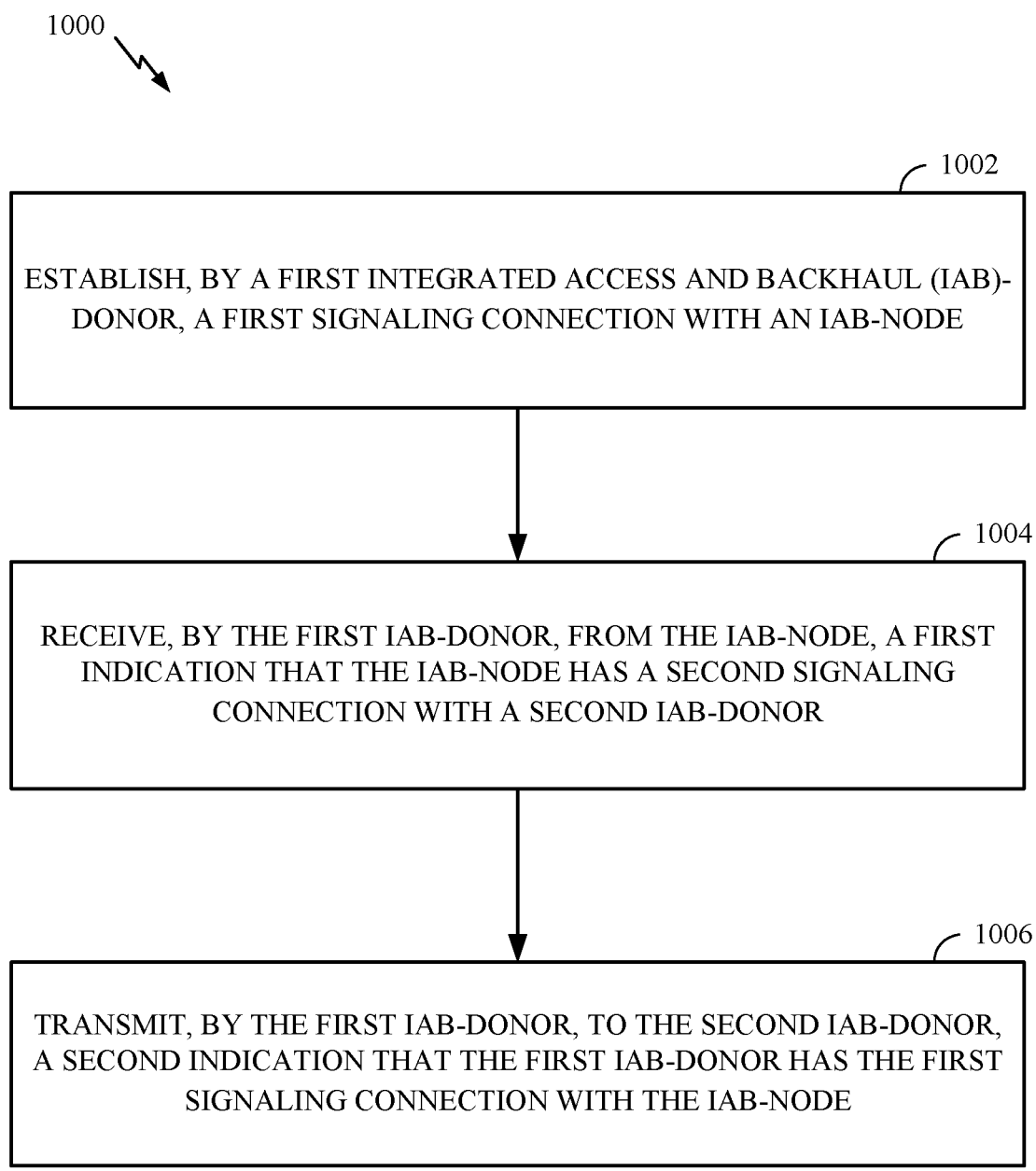
FIG. 10 is another flow diagram illustrating example operations for wireless communication by a donor node of an IAB network, in accordance with certain aspects of the present disclosure.

FIG. 10 is a flow diagram illustrating example operations 1000 for wireless communication by a first IAB-donor (e.g., having a DU and CU component), in accordance with certain aspects of the present disclosure. For example, operations 1000 may be performed by IAB-donor 2 in FIGS. 7A and 7B. Operations 1000 may be considered complementary to operations 800 of FIG. 8 performed by an IAB-node.

Operations 1000 may be implemented as software components that are executed and run on one or more processors (e.g., controller/processor 240 of FIG. 2). Further, the transmission and reception of signals by the IAB-donor in operations 1000 may be enabled, for example, by one or more antennas (e.g., antennas 234 of FIG. 2). In certain aspects, the transmission and/or reception of signals by the IAB-donor may be implemented via a bus interface of one or more processors (e.g., controller/processor 230, 220, 238, 240, and 244) obtaining and/or outputting signals.

Operations 1000 may begin, at block 1002, by the IAB-donor establishing a first signaling connection with an IAB-node.

At block 1004, the IAB-donor receives, from the IAB-node, a first indication that the IAB-node has a second signaling connection with a second IAB-donor.

At block 1006, the IAB-donor transmits, to the second IAB-donor, a second indication that the first IAB-donor has the first signaling connection with the IAB-node.

As an illustrative example using the entities illustrated FIGS. 7A and 7B, at 1002, IAB-donor 2 may establish a first signaling connection with IAB-node 3. At 1004, IAB-donor 2 may receive, from IAB-node 3, a first indication that IAB-node 3 has a second signaling connection with IAB-donor 3. At 1006, IAB-donor 2 transmits, to IAB-donor 3, a second indication that IAB-donor 2 has the first signaling connection with IAB-node 3.

Operations 800 and 900 of FIGS. 8 and 9 may be described with reference to FIG. 11A which is a call flow diagram illustrating an example method for inter-donor topology discovery in an IAB network, in accordance with certain aspects of the present disclosure. Operations 800 and 1000 of FIGS. 8 and 10 may be described with reference to FIG. 11B which is a call flow diagram illustrating another example method for inter-donor topology discovery in an IAB network, in accordance with certain aspects of the present disclosure.

Figure 11A:
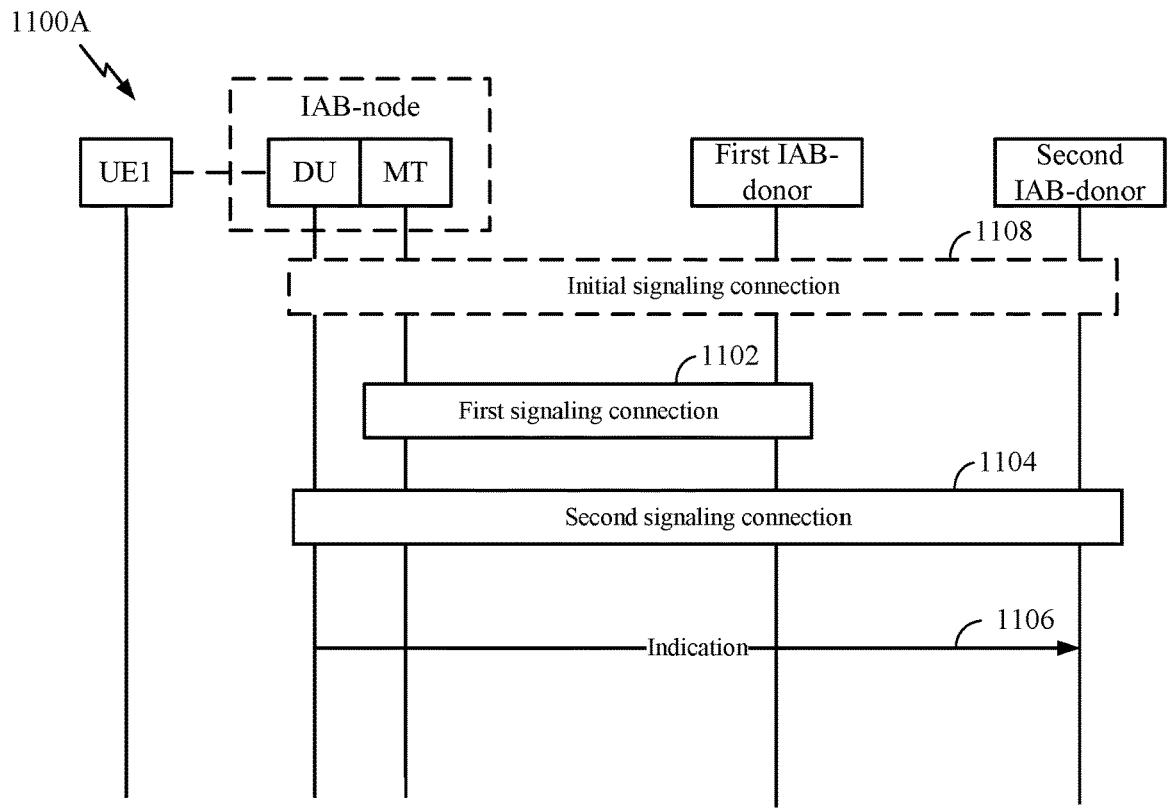
FIG. 11A is a call flow diagram illustrating an example method for inter-donor topology discovery in an IAB network, in accordance with certain aspects of the present disclosure.

In the illustrative example of FIG. 11A, an IAB-node may inform an (unaware) IAB-donor of a context transfer of an MT component of the IAB-node. As shown in FIG. 11A, an IAB-node may establish a first signaling connection 1102 with a first IAB donor.

In some aspects, establishing the first signaling connection with the first IAB-donor occurs due to a migration of the IAB-node caused by an HO procedure. In some aspects, establishing the first signaling connection with the first IAB-donor occurs due to a migration of the IAB-node caused by a re-establishment procedure initiated by the IAB-node. The first signaling connection may be an RRC connection between an MT component of the IAB-node and the first IAB-donor. The RRC connection may be established via at least one of: an RRC connection establishment request, an RRC reconfiguration request, an RRC connection re-establishment request, or an RRC connection resume request (dependent upon whether the first signaling connection was established based on an HO or re-establishment procedure).

Subsequent to establishing the first signaling connection 1102, the IAB-node may establish a second signaling connection 1104 with a second IAB donor. The second signaling may be a wireline interface connection using at least one of: F1-C or F1-AP protocols. In some aspects, the wireline interface connection may be established via the first IAB-donor (e.g., via a DU of the first IAB-donor).

In some aspects, the establishment of the second signaling connection 1104 to the second IAB-donor may be a re-direction of an initial (or prior) connection to the second IAB-donor. For example, an initial signaling connection 1108 between the IAB-node and the second IAB-donor may have been established prior to establishing the first signaling connection 1102. Due, at least in part, to a migration of the IAB-node (e.g., migration of the MT component of the IAB-node during HO or re-establishment) this initial signaling connection 1108 may be interrupted. Accordingly, the established second signaling connection 1104 may be considered a re-direction of the initial signaling connection 1108 on a recovery path towards the first IAB-donor.

Because the MT and DU of the IAB-node were not collocated prior to migration of the MT (e.g., not collocated prior to the establishment of the first signaling connection 1102), the second IAB-donor may be may be blind to (e.g., unaware of) the context transfer of the MT component to the first IAB-donor. Accordingly, an indication 1106 (originating from the DU of the IAB-node) may be transmitted by the IAB-node to the second IAB-donor. The indication may indicate that the IAB-node has a first signaling connection to the first IAB-donor. In some aspects, the IAB-node may transmit a BAP address allocated to the IAB-node by the first IAB donor to inform the second IAB-donor. In some aspects, the IAB-node may transmit an identifier of the first IAB-donor to inform the second IAB-donor.

Figure 11B:
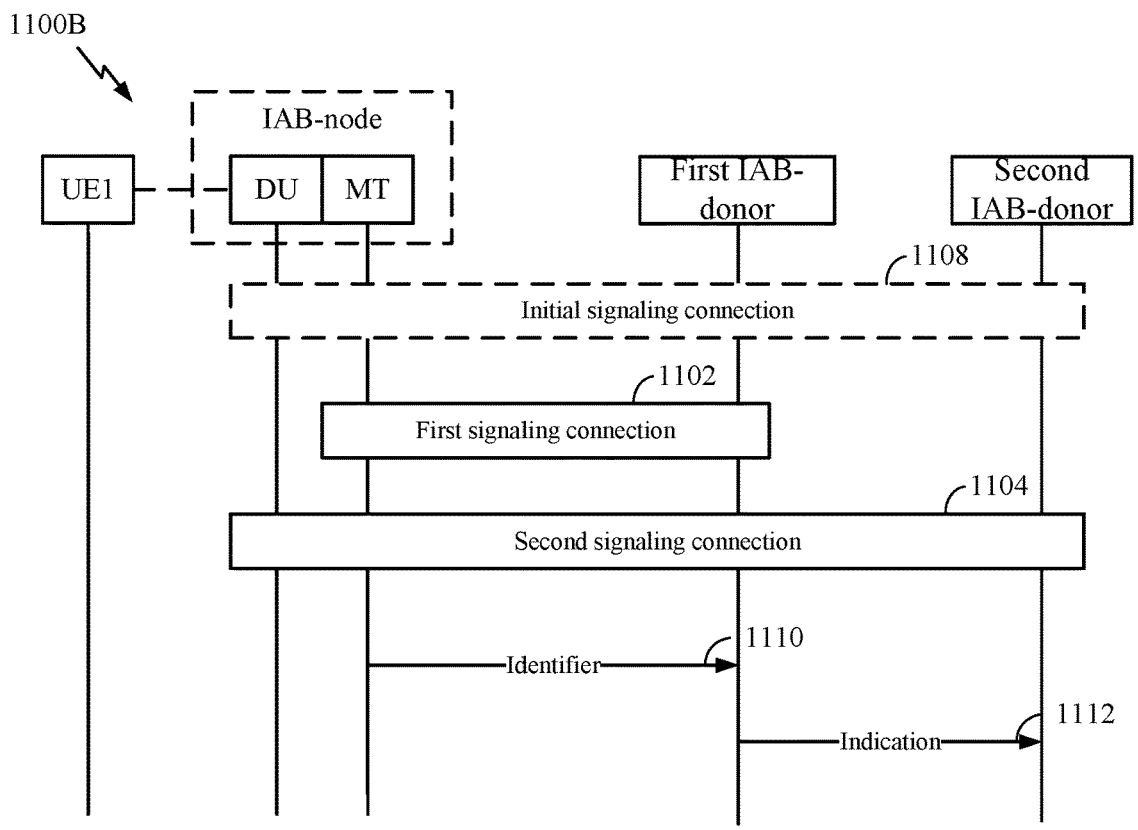
FIG. 11B is a call flow diagram illustrating another example method for inter-donor topology discovery in an IAB network, in accordance with certain aspects of the present disclosure.

In the illustrative example of FIG. 11B, the first IAB-donor may transmit an indication to the second IAB-donor to inform the second IAB-donor of the context transfer of the MT component of the IAB-node, as opposed to the IAB-node transmitting the indication to the second IAB-donor as illustrated in FIG. 11A.

Similar to FIG. 11A, in FIG. 11B, an IAB-node may establish a first signaling connection 1102 with a first IAB-donor and a second signaling connection 1104 with a second IAB-donor. The establishment of the second signaling connection 1104 to the second IAB-donor may be a re-direction of an initial (or prior) signaling connection 1108 to the second IAB-donor.

However unlike FIG. 11A, in FIG. 11B, the IAB-node may transmit an identifier 1110 of the second IAB-donor to the first IAB-donor thereby allowing the first IAB-donor to transmit an indication 1112 to the second IAB-donor indicating that the IAB-node has the first signaling connection with the first IAB-donor. In some aspects, the identifier 1110 may be a gNB-ID of the second IAB-donor (given the second IAB-donor is a gNB). In some aspects, the identifier 1110 may be a cell ID (e.g., carrying a gNB-ID of the second IAB-donor) of a cell (or an old cell) on which the IAB-node is (or was) served by the second IAB-donor. For example, a gNB-ID may be part of a cell ID (e.g., New Radio Cell Global Identifier (NCGI))/New Radio Cell Identifier (NCI); accordingly, where a gNB (e.g., IAB-donor) serves ten cells, each of these cells may have a cell ID that is a concatenation of the gNB-ID and a local ID. Therefore, the cell-ID, when transmitted to the first IAB-donor may inform the first IAB-donor of the second IAB-donor because the cell-ID may carry the gNB-ID of the second IAB-donor. In some aspects, the identifier 1110 may be routing information of the second IAB-donor (e.g., an IP address).

Regardless of what entity transmits the indication, either the IAB-node as shown in FIG. 11A or the first IAB-donor as shown in FIG. 11B, the second IAB-donor may receive the indication that the IAB-node has a first signaling connection to the first IAB-donor. In response to receiving the indication, the second IAB-donor may transfer, to the first IAB-donor, information related to the IAB-node, re-establish traffic between the second IAB-donor and the IAB-node via a topology of the first IAB-donor, or any combination thereof.

According to certain aspects, transferring, to the first IAB-donor, information related to the IAB-node may include transferring at least one of: a context of a MT component (or part) of the IAB-node, a context of a DU component (or part) of the IAB-node, a context of a child of the IAB-node or a context of a descendant of the IAB-node (e.g., a UE). In some aspects, the second IAB-donor may receive, from the first IAB-donor acknowledgement (ACK) feedback in response to transmitting the information related to the IAB-node.

According to certain aspects, re-establishing traffic between the second IAB-donor and the IAB-node may include exchanging by the second IAB-donor, with the first IAB-donor, traffic information related to the MT component of the IAB-node, the DU component of the IAB-node, a child of the IAB-node, a descendant of the IAB-node, or any combination thereof. The traffic information may include at least one of: QoS information, QoS mapping information, a BAP configuration allocated to the IAB-node, or an IP configuration allocated to the IAB-node. For example, the BAP configuration and/or the IP configuration may be exchanged to establish BAP/IP transport for rerouted traffic via a topology of the first IAB-donor. The BAP configuration may include a BAP address, BAP routing ID/path ID, radio link control (RLC) channel (CH) ID, mappings, etc. The BAP configuration may, in some cases, be provided on an RRC connection, but, in most cases, the BAP configuration may be provided on the F1 connection. Accordingly, the BAP configuration may be provided by either a CU of the first IAB-donor or a CU of the second IAB-donor. The IP configuration (e.g., IP address) may be allocated on an RRC connection; thus, which CU is allocating this IP configuration may depend on whether traffic is being re-established for a migrating IAB-node or a descendant of the migrating IAB-node (e.g., First IAB-donor for migrating node but could be Second IAB-donor for descendant nodes).

According to certain aspects, re-establishing traffic between the second IAB-donor and the IAB-node may include re-establishing F1 traffic or re-establishing non-F1 traffic.

Example Wireless Communications Devices

Figure 12:
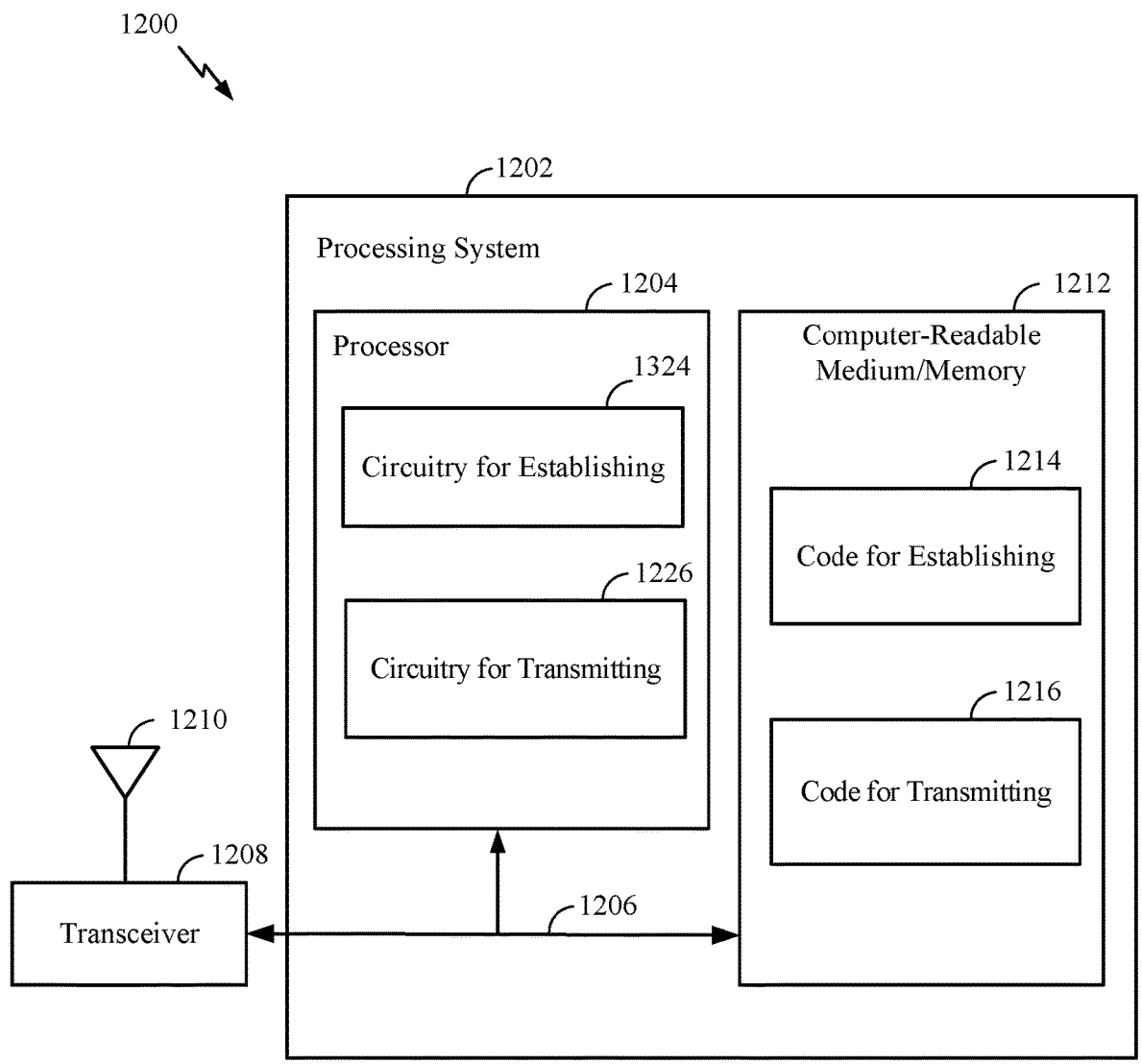
FIG. 12 illustrates a communications device that may include various components configured to perform operations for the techniques disclosed herein, in accordance with certain aspects of the present disclosure.

FIG. 12 illustrates a communications device 1200 (e.g., a transmitter such as a UE) that may include various components (e.g., corresponding to means-plus-function components) configured to perform operations for the techniques disclosed herein, such as the operations illustrated in FIG. 8. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 8, or other operations for performing the various techniques discussed herein.

In certain aspects, computer-readable medium/memory 1212 stores code 1214 for establishing and code 1216 for transmitting. In some aspects, code 1214 for establishing may include code for establishing a first signaling connection with a first IAB-donor. In some aspects, code 1214 for establishing may include code for establishing a second signaling connection with a second IAB-donor. In some aspects, code 1216 for transmitting may include code for transmitting an indication to the second IAB-donor that the IAB-node has a first signaling connection to the first IAB-donor.

In certain aspects, the processor 1204 has circuitry configured to implement the code stored in the computer-readable medium/memory 1212. The processor 1204 includes circuitry 1224 for establishing and circuitry 1226 for transmitting.

In some aspects, circuitry 1224 for establishing may include circuitry for establishing a first signaling connection with a first IAB-donor. In some aspects, circuitry 1224 for establishing may include circuitry for establishing a second signaling connection with a second IAB-donor. In some aspects, circuitry 1224 for establishing may include circuitry for transmitting an indication to the second IAB-donor that the IAB-node has a first signaling connection to the first IAB-donor.

In some aspects, the operations illustrated in FIG. 8, as well as other operations described herein, may be implemented by one or more means-plus-function components. For example, in some aspects, such operations may be implemented by means for establishing and means for transmitting.

In some aspects, means for establishing and means for transmitting, includes a processing system, which may include one or more processors, such as the receive processor 258, the transmit processor 264, the TX MIMO processor 266, and/or the controller/processor 280 of the UE 120 illustrated in FIG. 2 and/or the processing system 1202 of the communication device 1200 in FIG. 12.

The transceiver 1208 may provide a means for receiving or transmitting information. Information may be passed on to other components of the communications device 1200. The antenna 1210 may correspond to a single antenna or a set of antennas. The transceiver 1208 may provide means for transmitting signals generated by other components of the communications device 1200.

Means for receiving or means for obtaining may include a receiver (such as the receive processor 258) or antenna(s) 252 of the UE 120 illustrated in FIG. 2. Means for transmitting or means for outputting may include a transmitter (such as the transmit processor 264) or antenna(s) 252 of the UE 120 illustrated in FIG. 2.

Notably, FIG. 12 is just use one example, and many other examples and configurations of communications device 1200 are possible.

Figure 13:
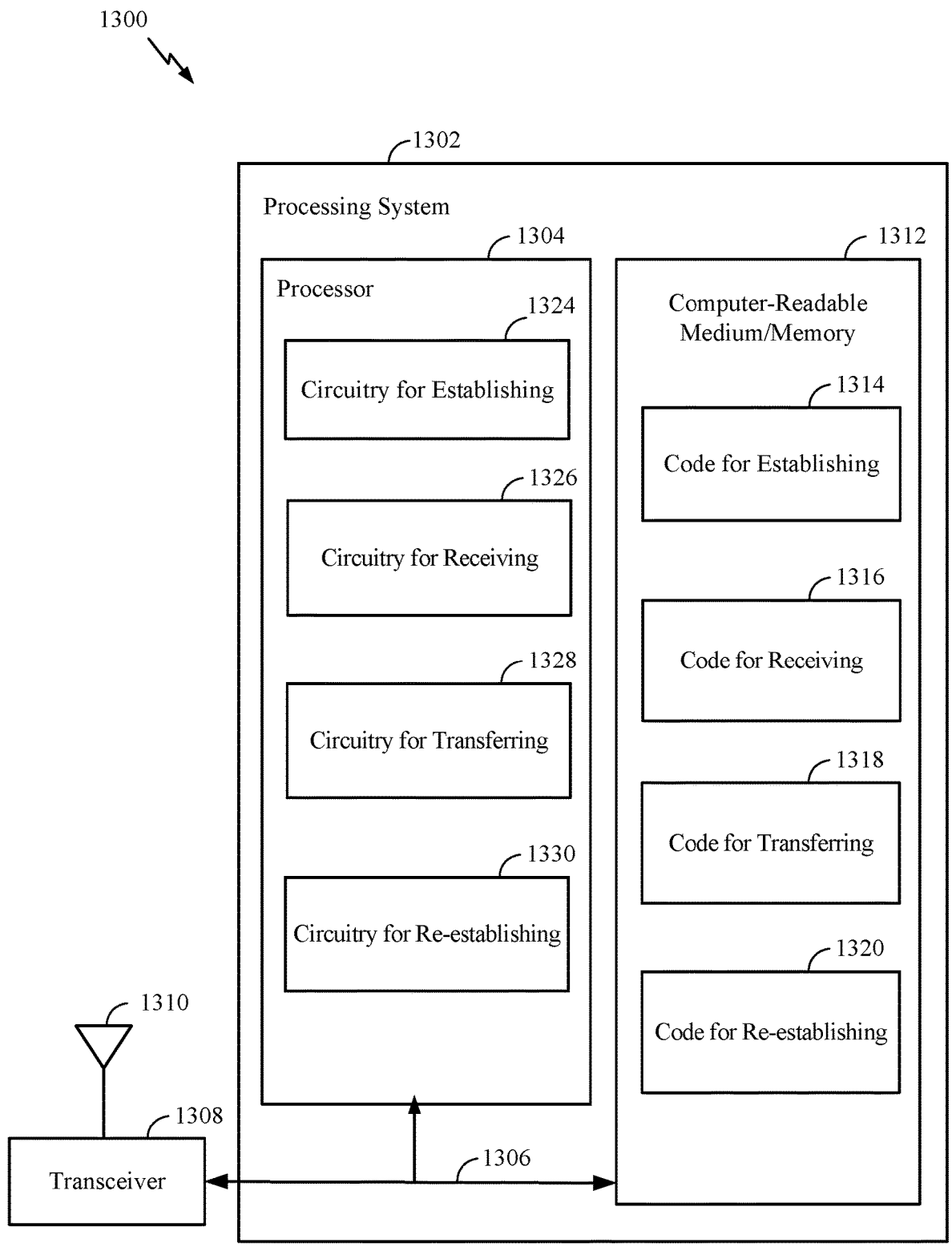
FIG. 13 illustrates a communications device that may include various components configured to perform operations for the techniques disclosed herein, in accordance with certain aspects of the present disclosure.

FIG. 13 illustrates a communications device 1300 (e.g., a receiver such as a gNB) that may include various components (e.g., corresponding to means-plus-function components) configured to perform operations for the techniques disclosed herein, such as the operations illustrated in FIG. 9. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 9, or other operations for performing the various techniques discussed herein.

In certain aspects, computer-readable medium/memory 1312 stores code 1314 for establishing; code 1316 for receiving; code 1318 for transferring; and code 1320 for re-establishing. In some aspects, code 1314 for establishing may include code for establishing a first signaling connection with an IAB-node. In some aspects, code 1316 for receiving may include code for receiving an indication that the IAB-node has a second signaling connection with a second IAB-donor. In some aspects, code 1318 for transferring may include code for transferring, in response to receiving the indication, to the second IAB-donor, information related to the IAB-node. In some aspects, code 1320 for re-establishing may include code for re-establishing, in response to receiving the indication, traffic between the first IAB-donor and the IAB-node via a topology of the second IAB-donor.

In certain aspects, the processor 1304 has circuitry configured to implement the code stored in the computer-readable medium/memory 1312. The processor 1304 includes circuitry 1324 for establishing; circuitry 1326 for receiving; circuitry 1328 for transferring; and circuitry 1330 for re-establishing.

In some aspects, circuitry 1324 for establishing may include circuitry for establishing a first signaling connection with an IAB-node. In some aspects, circuitry 1326 for receiving may include circuitry for receiving an indication that the IAB-node has a second signaling connection with a second IAB-donor. In some aspects, circuitry 1328 for transferring may include circuitry for transferring, in response to receiving the indication, to the second IAB-donor, information related to the IAB-node. In some aspects, circuitry 1330 for re-establishing may include circuitry for re-establishing, in response to receiving the indication, traffic between the first IAB-donor and the IAB-node via a topology of the second IAB-donor.

In some aspects, the operations illustrated in FIG. 9, as well as other operations described herein, may be implemented by one or more means-plus-function components. For example, in some aspects, such operations may be implemented by means for establishing, means for receiving, means for transferring, and means for re-establishing.

In some aspects, means for establishing, means for transferring, means for re-establishing, includes a processing system, which may include one or more processors, such as the receive processor 238, the transmit processor 220, the TX MIMO processor 230, and/or the controller/processor 240 of the BS 110 illustrated in FIG. 2 and/or the processing system 1302 of the communication device 1300 in FIG. 13.

The transceiver 1308 may provide a means for receiving or transmitting information. Information may be passed on to other components of the communications device 1300. The antenna 1310 may correspond to a single antenna or a set of antennas. The transceiver 1308 may provide means for transmitting signals generated by other components of the communications device 1300.

Means for receiving or means for obtaining may include a receiver (such as the receive processor 238) or antenna(s) 234 of the BS 110 illustrated in FIG. 2. Means for transmitting or means for outputting (or means for transferring) may include a transmitter (such as the transmit processor 220) or antenna(s) 234 of the BS 110 illustrated in FIG. 2.

Notably, FIG. 13 is just use one example, and many other examples and configurations of communications device 1300 are possible.

Figure 14:
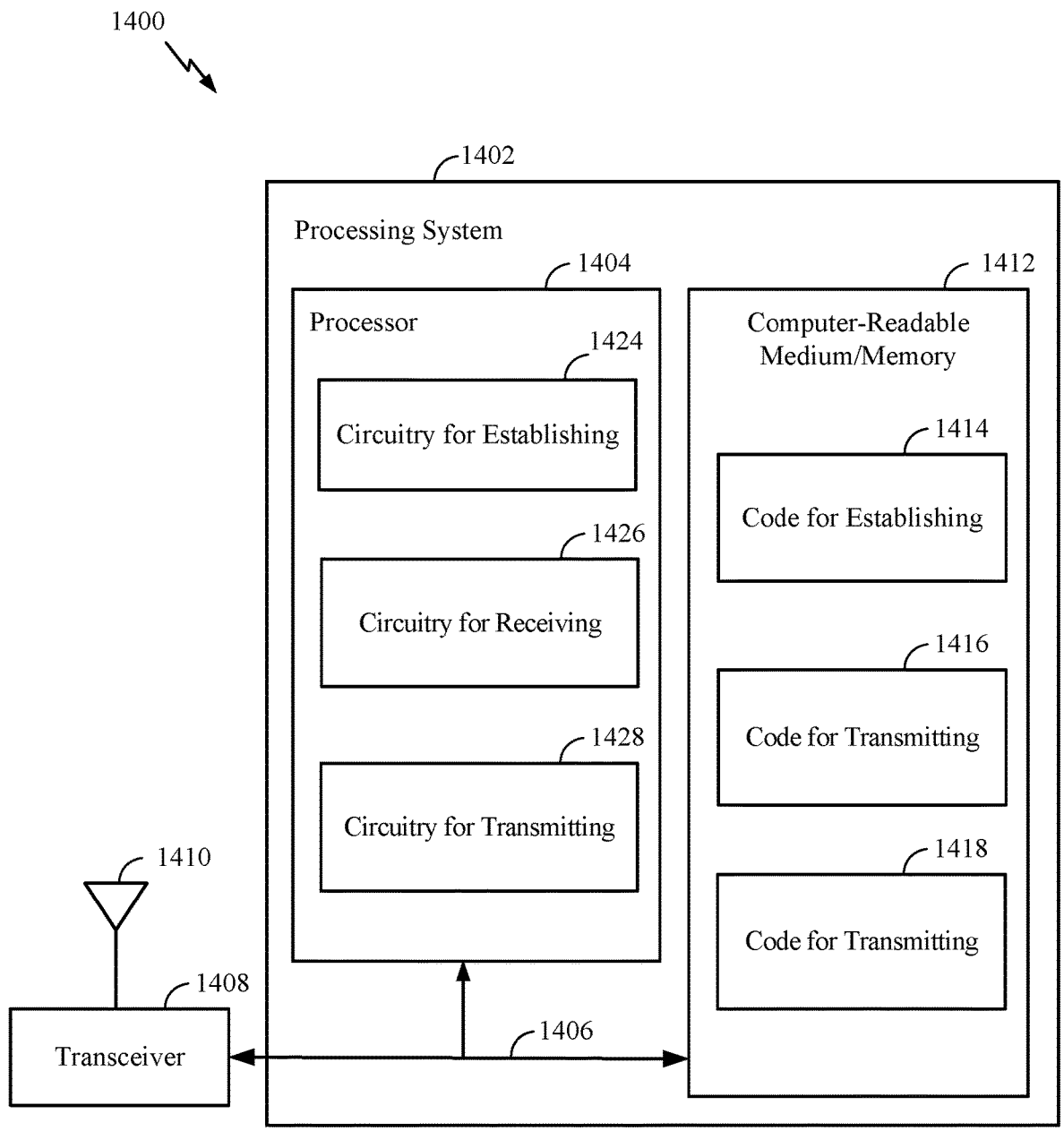
FIG. 14 illustrates a communications device that may include various components configured to perform operations for the techniques disclosed herein, in accordance with certain aspects of the present disclosure.

FIG. 14 illustrates a communications device 1400 (e.g., a receiver such as a gNB) that may include various components (e.g., corresponding to means-plus-function components) configured to perform operations for the techniques disclosed herein, such as the operations illustrated in FIG. 10. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 10, or other operations for performing the various techniques discussed herein.

In certain aspects, computer-readable medium/memory 1412 stores code 1414 for establishing; code 1416 for receiving; and code 1418 for transmitting.

In some aspects, code 1414 for establishing may include code for establishing a first signaling connection with an IAB-node. In some aspects, code 1416 for receiving may include code for receiving, from the IAB-node, a first indication that the IAB-node has a second signaling connection with a second IAB-donor. In some aspects, code 1418 for transmitting may include code for transmitting, to the second IAB-donor, a second indication that the first IAB-donor has the first signaling connection with the IAB-node.

In certain aspects, the processor 1404 has circuitry configured to implement the code stored in the computer-readable medium/memory 1412. The processor 1404 includes circuitry 1424 for establishing; circuitry 1426 for receiving; and circuitry 1428 for transmitting.

In some aspects, circuitry 1424 for establishing may include circuitry for establishing a first signaling connection with an IAB-node. In some aspects, circuitry 1426 for receiving may include circuitry for receiving, from the IAB-node, a first indication that the IAB-node has a second signaling connection with a second IAB-donor. In some aspects, circuitry 1428 for transmitting may include circuitry for transmitting may include code for transmitting, to the second IAB-donor, a second indication that the first IAB-donor has the first signaling connection with the IAB-node.

In some aspects, the operations illustrated in FIG. 10, as well as other operations described herein, may be implemented by one or more means-plus-function components. For example, in some aspects, such operations may be implemented by means for establishing, means for receiving, and means for transmitting.

In some aspects, means for establishing includes a processing system, which may include one or more processors, such as the receive processor 238, the transmit processor 220, the TX MIMO processor 230, and/or the controller/processor 240 of the BS 110 illustrated in FIG. 2 and/or the processing system 1402 of the communication device 1400 in FIG. 14.

The transceiver 1408 may provide a means for receiving or transmitting information. Information may be passed on to other components of the communications device 1400. The antenna 1410 may correspond to a single antenna or a set of antennas. The transceiver 1408 may provide means for transmitting signals generated by other components of the communications device 1400.

Means for receiving or means for obtaining may include a receiver (such as the receive processor 238) or antenna(s) 234 of the BS 110 illustrated in FIG. 2. Means for transmitting or means for outputting may include a transmitter (such as the transmit processor 220) or antenna(s) 234 of the BS 110 illustrated in FIG. 2.

Notably, FIG. 14 is just use one example, and many other examples and configurations of communications device 1400 are possible.

Example Clauses

Implementation examples are described in the following numbered clauses:

Clause 1: An apparatus for wireless communication by an integrated access and backhaul (IAB)-node, comprising: at least one processor; and a memory coupled to the at least one processor, the memory including instructions executable by the at least one processor to cause the apparatus to: establish a first signaling connection with a first IAB-donor; establish a second signaling connection with a second IAB-donor; and transmit an indication to the second IAB-donor that the IAB-node has a first signaling connection to the first IAB-donor.

Clause 2: The apparatus of Clause 1, wherein establishing the first signaling connection with the first IAB-donor occurs due to at least one of: a migration of the IAB-node caused by a handover (HO) procedure; or a migration of the IAB-node caused by a re-establishment procedure initiated by the IAB-node.

Clause 3: The apparatus of Clause 1 or 2, wherein the first signaling connection comprises a radio resource control (RRC) connection.

Clause 4: The apparatus of Clause 3, wherein establishing the RRC connection is via at least one of: an RRC connection establishment request; an RRC reconfiguration request; an RRC connection re-establishment request; or an RRC connection resume request.

Clause 5: The apparatus of any of Clauses 1-4, wherein the second signaling connection comprises a wireline interface connection using at least one of: F1 control plane (F1-C) protocols; or F1 application layer signaling protocols (F1-AP).

Clause 6: The apparatus of Clause 5, wherein establishing the wireline interface connection is via a distributed unit (DU) of the first IAB-donor.

Clause 7: The apparatus of any of Clauses 1-6, wherein: an initial signaling connection between the IAB-node and the second IAB-donor established prior to establishing the first signaling connection with the first IAB-donor is interrupted due, at least in part, to a migration of the IAB-node; and in order to establish the second signaling connection with the second IAB-donor, the memory further includes instructions executable by the at least one processor to cause the apparatus to re-direct the initial signaling connection on a recovery path towards the first IAB-donor.

Clause 8: The apparatus of any of Clauses 1-7, wherein in order to indicate to the second IAB-donor that the IAB-node has the first signaling connection to the first IAB-donor, the memory further includes instructions executable by the at least one processor to cause the apparatus to transmit, to the second IAB-donor, a backhaul adaptation protocol (BAP) address allocated to the IAB-node by the first IAB donor.

Clause 9: The apparatus of any of Clauses 1-8, wherein in order to indicate to the second IAB-donor that the IAB-node has the first signaling connection to the first IAB-donor, the memory further includes instructions executable by the at least one processor to cause the apparatus to transmit, to the second IAB-donor, an identifier of the first IAB-donor.

Clause 10: The apparatus of any of Clauses 1-9, wherein the memory further includes instructions executable by the at least one processor to cause the apparatus to: transmit an identifier of the second IAB-donor to the first IAB-donor thereby allowing the first IAB-donor to indicate to the second IAB-donor that the IAB-node has the first signaling connection with the first IAB-donor.

Clause 11: An apparatus for wireless communication by a first integrated access and backhaul (IAB)-donor, comprising: at least one processor; and a memory coupled to the at least one processor, the memory including instructions executable by the at least one processor to cause the apparatus to: establish a first signaling connection with an IAB-node; receive an indication that the IAB-node has a second signaling connection with a second IAB-donor; and in response to receiving the indication: transfer, to the second IAB-donor, information related to the IAB-node; re-establish traffic between the first IAB-donor and the IAB-node via a topology of the second IAB-donor; or any combination thereof.

Clause 12: The apparatus of Clause 11, wherein the first IAB-donor receives the indication from at least one of: the IAB-node; or the second IAB-donor.

Clause 13: The apparatus of Clause 11 or 12, wherein the information related to the IAB-node comprises at least one of: a context of a mobile termination (MT) part of the IAB-node; a context of a distributed unit (DU) part of the IAB-node; a context of a child of the IAB-node; or a context of a descendant of the IAB-node.

Clause 14: The apparatus of any of Clauses 11-13, wherein the memory further includes instructions executable by the at least one processor to cause the apparatus to: receive, from the second IAB-donor, acknowledgement (ACK) feedback in response to transmitting the information related to the IAB-node.

Clause 15: The apparatus of any of Clauses 11-14, wherein in order to re-establish traffic between the first IAB-donor and the IAB-node, the memory further includes instructions executable by the at least one processor to cause the apparatus to exchange, with the second IAB-donor, traffic information related to a mobile termination (MT) part of the IAB-node, a distributed unit (DU) part of the IAB-node, a child of the IAB-node, a descendant of the IAB-node, or any combination thereof.

Clause 16: The apparatus of Clause 15, wherein the traffic information comprises at least one of: quality of service (QoS) information; QoS mapping information; a backhaul adaptation protocol (BAP) configuration allocated to the IAB-node; or an internet protocol (IP) configuration allocated to the IAB-node.

Clause 17: The apparatus of any of Clauses 11-16, wherein re-establishing traffic between the first IAB-donor and the IAB-node comprises: re-establishing F1 traffic; or re-establishing non-F1 traffic.

Clause 18: The apparatus of any of Clauses 11-17, wherein the first signaling connection comprises a wireline interface connection using at least one of: F1 control plane (F1-C) protocols; or F1 application layer signaling protocols (F1-AP).

Clause 19: The apparatus of any of Clauses 11-18, wherein: an initial signaling connection between the first IAB-donor and the IAB-node established prior to establishing the second signaling connection with the second IAB-donor is interrupted due, at least in part, to a migration of the IAB-node; and wherein in order to establish the first signaling connection with the IAB-node, the memory further includes instructions executable by the at least one processor to cause the apparatus to re-direct the initial signaling connection on a recovery path towards the IAB-node.

Clause 20: The apparatus of Clause 19, wherein migration of the IAB-node occurs due to at least one of: a handover (HO) procedure; or a re-establishment procedure initiated by the IAB-node.

Clause 21: An apparatus for wireless communication by a first integrated access and backhaul (IAB)-donor, comprising: at least one processor; and a memory coupled to the at least one processor, the memory including instructions executable by the at least one processor to cause the apparatus to: establish a first signaling connection with an IAB-node; receive, from the IAB-node, a first indication that the IAB-node has a second signaling connection with a second IAB-donor; and transmit, to the second IAB-donor, a second indication that the first IAB-donor has the first signaling connection with the IAB-node.

Clause 22: The apparatus of Clause 21, wherein the first indication comprises an identifier of the second IAB-donor.

Clause 23: The apparatus of Clause 21 or 22, in response to transmitting the second indication, wherein the memory further includes instructions executable by the at least one processor to cause the apparatus to: receive, from the second IAB-donor, information related to the IAB-node; exchange, with the second IAB-donor, traffic information related to the IAB node; or any combination thereof.

Clause 24: The apparatus of Clause 23, wherein the information related to the IAB-node comprises at least one of: a context of a mobile termination (MT) part of the IAB-node; a context of a distributed unit (DU) part of the IAB-node; a context of a child of the IAB-node; or a context of a descendant of the IAB-node.

Clause 25: The apparatus of Clause 23 or 24, wherein the memory further includes instructions executable by the at least one processor to cause the apparatus to: transmit, to the second IAB-donor, acknowledgement (ACK) feedback in response to receiving the information related to the IAB-node.

Clause 26: The apparatus of any of Clauses 23-25, wherein traffic information related to the IAB node comprises traffic information related to a mobile termination (MT) part of the IAB-node, a distributed unit (DU) part of the IAB-node, a child of the IAB-node, a descendant of the IAB-node, or any combination thereof.

Clause 27: The apparatus of Clause 26, wherein the traffic information comprises at least one of: quality of service (QoS) information; QoS mapping information; a backhaul adaptation protocol (BAP) configuration allocated to the IAB-node; or an internet protocol (IP) configuration with the first IAB-donor allocated to the IAB-node.

Clause 28: The apparatus of any of Clauses 21-27, wherein the first signaling connection comprises a radio resource control (RRC) connection.

Clause 29: The apparatus of any of Clauses 21-28, wherein establishing the first signaling connection with the IAB node occurs due to at least one of: a migration of the IAB-node caused by a handover (HO) procedure; or a migration of the IAB-node caused by a re-establishment procedure initiated by the IAB-node.

Clause 30: A method for wireless communication by a first integrated access and backhaul (IAB)-donor, comprising: establishing a first signaling connection with an IAB-node; receiving an indication that the IAB-node has a second signaling connection with a second IAB-donor; and in response to receiving the indication: transferring, to the second IAB-donor, information related to the IAB-node; re-establishing traffic between the first IAB-donor and the IAB-node via a topology of the second IAB-donor; or any combination thereof.

Clause 31: A method for wireless communication by a first integrated access and backhaul (IAB)-donor, comprising: establishing a first signaling connection with an IAB-node; receiving an indication that the IAB-node has a second signaling connection with a second IAB-donor; and in response to receiving the indication: transferring, to the second IAB-donor, information related to the IAB-node; re-establishing traffic between the first IAB-donor and the IAB-node via a topology of the second IAB-donor; or any combination thereof.

Clause 32: A method for wireless communication by a first integrated access and backhaul (IAB)-donor, comprising: establishing a first signaling connection with an IAB-node; receiving, from the IAB-node, a first indication that the IAB-node has a second signaling connection with a second IAB-donor; and transmitting, to the second IAB-donor, a second indication that the first IAB-donor has the first signaling connection with the IAB-node.

Clause 33: An apparatus, comprising means for performing a method in accordance with any one of Clauses 1-29.

Clause 34: A non-transitory computer-readable medium comprising executable instructions that, when executed by one or more processors of an apparatus, cause the apparatus to perform a method in accordance with any one of Clauses 1-29.

ADDITIONAL CONSIDERATIONS

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system. For example, in some cases, processors such as those shown in FIG. 2 may be configured to perform operations 600 of FIG. 6 and/or operations 700 of FIG. 7.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 6 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication by an integrated access and backhaul (IAB)-node, comprising:
   a memory comprising instructions and one or more processors configured, individually or in any combination, to execute the instructions and cause the apparatus to:
   establish a first signaling connection with a first IAB-donor;
   establish a second signaling connection with a second IAB-donor, wherein the IAB-node is connected to both the first IAB-donor and the second IAB-donor; and
   transmit an indication to the second IAB-donor, after establishing the second signaling connection with the second IAB-donor, that the IAB-node has the first signaling connection to the first IAB-donor.

2. The apparatus of claim 1, wherein establishing the first signaling connection with the first IAB-donor occurs due to at least one of:
   a migration of the IAB-node caused by a handover (HO) procedure; or
   a migration of the IAB-node caused by a re-establishment procedure initiated by the IAB-node.

3. The apparatus of claim 1, wherein the first signaling connection comprises a radio resource control (RRC) connection.

4. The apparatus of claim 3, wherein establishing the RRC connection is via at least one of:
   an RRC connection establishment request;
   an RRC reconfiguration request;
   an RRC connection re-establishment request; or
   an RRC connection resume request.

5. The apparatus of claim 1, wherein the second signaling connection comprises a wireline interface connection using at least one of:
   F1 control plane (F1-C) protocols; or
   F1 application layer signaling protocols (F1-AP).

6. The apparatus of claim 5, wherein establishing the wireline interface connection is via a distributed unit (DU) of the first IAB-donor.

7. The apparatus of claim 1, wherein:
   an initial signaling connection between the IAB-node and the second IAB-donor established prior to establishing the first signaling connection with the first IAB-donor is interrupted due, at least in part, to a migration of the IAB-node; and in order to establish the second signaling connection with the second IAB-donor, the one or more processors are configured, individually or in any combination, to execute the instructions and cause the apparatus to re-direct the initial signaling connection on a recovery path towards the first IAB-donor.

8. The apparatus of claim 1, wherein in order to indicate to the second IAB-donor that the IAB-node has the first signaling connection to the first IAB-donor, the one or more processors are configured, individually or in any combination, to execute the instructions and cause the apparatus to transmit, to the second IAB-donor, a backhaul adaptation protocol (BAP) address allocated to the IAB-node by the first IAB donor.

9. The apparatus of claim 1, wherein in order to indicate to the second IAB-donor that the IAB-node has the first signaling connection to the first IAB-donor, the one or more processors are configured, individually or in any combination, to execute the instructions and cause the apparatus to transmit, to the second IAB-donor, an identifier of the first IAB-donor.

10. The apparatus of claim 1, wherein the one or more processors are configured, individually or in any combination, to execute the instructions and cause the apparatus to:
transmit an identifier of the second IAB-donor to the first IAB-donor thereby allowing the first IAB-donor to indicate to the second IAB-donor that the IAB-node has the first signaling connection with the first IAB-donor.

11. An apparatus for wireless communication by a first integrated access and backhaul (IAB)-donor, comprising:
a memory comprising instructions and one or more processors configured, individually or in any combination, to execute the instructions and cause the apparatus to:
establish a first signaling connection with an IAB-node;
receive an indication from the IAB-node based on the IAB-node establishing a second signaling connection with a second IAB-donor that the IAB-node has the second signaling connection with the second IAB-donor, wherein the second signaling connection is established with the IAB-node due to a migration of the IAB-node caused by a handover (HO) procedure, and wherein the IAB-node is connected to both the first IAB-donor and the second IAB-donor; and
in response to receiving the indication:
transfer, to the second IAB-donor, information related to the IAB-node;
re-establish traffic between the first IAB-donor and the IAB-node via a topology of the second IAB-donor; or
any combination thereof.

12. The apparatus of claim 11, wherein the first IAB-donor receives the indication from at least one of:
the IAB-node; or
the second IAB-donor.

13. The apparatus of claim 11, wherein the information related to the IAB-node comprises at least one of:
a context of a mobile termination (MT) part of the IAB-node;
a context of a distributed unit (DU) part of the IAB-node;
a context of a child of the IAB-node; or
a context of a descendant of the IAB-node.

14. The apparatus of claim 11, wherein the one or more processors are configured, individually or in any combination, to execute the instructions and cause the apparatus to:
receive, from the second IAB-donor, acknowledgement (ACK) feedback in response to transmitting the information related to the IAB-node.

15. The apparatus of claim 11, wherein in order to re-establish traffic between the first IAB-donor and the IAB-node, the one or more processors are configured, individually or in any combination, to execute the instructions and cause the apparatus to exchange, with the second IAB-donor, traffic information related to a mobile termination (MT) part of the IAB-node, a distributed unit (DU) part of the IAB-node, a child of the IAB-node, a descendant of the IAB-node, or any combination thereof.

16. The apparatus of claim 15, wherein the traffic information comprises at least one of:
quality of service (QoS) information;
QoS mapping information;
a backhaul adaptation protocol (BAP) configuration allocated to the IAB-node; or
an internet protocol (IP) configuration allocated to the IAB-node.

17. The apparatus of claim 11, wherein re-establishing traffic between the first IAB-donor and the IAB-node comprises:
re-establishing F1 traffic; or
re-establishing non-F1 traffic.

18. The apparatus of claim 11, wherein the first signaling connection comprises a wireline interface connection using at least one of:
F1 control plane (F1-C) protocols; or
F1 application layer signaling protocols (F1-AP).

19. The apparatus of claim 11, wherein:
an initial signaling connection between the first IAB-donor and the IAB-node established prior to establishing the second signaling connection with the second IAB-donor is interrupted due, at least in part, to the migration of the IAB-node; and
wherein in order to establish the first signaling connection with the IAB-node, the one or more processors are configured, individually or in any combination, to execute the instructions and cause the apparatus to re-direct the initial signaling connection on a recovery path towards the IAB-node.

20. An apparatus for wireless communication by a first integrated access and backhaul (IAB)-donor, comprising:
a memory comprising instructions and one or more processors configured, individually or in any combination, to execute the instructions and cause the apparatus to:
establish a first signaling connection with an IAB-node;
receive, from the IAB-node based on the IAB-node establishing a second signaling connection with a second IAB-donor, a first indication that the IAB-node has the second signaling connection with the second IAB-donor, wherein the IAB-node is connected to both the first IAB-donor and the second IAB-donor; and
transmit, to the second IAB-donor, a second indication that the first IAB-donor has the first signaling connection with the IAB-node.

21. The apparatus of claim 20, wherein the first indication comprises an identifier of the second IAB-donor.

22. The apparatus of claim 20, in response to transmitting the second indication, wherein the one or more processors are configured, individually or in any combination, to execute the instructions and cause the apparatus to:
receive, from the second IAB-donor, information related to the IAB-node;
exchange, with the second IAB-donor, traffic information related to the IAB node; or
any combination thereof.

23. The apparatus of claim 22, wherein the information related to the IAB-node comprises at least one of:
- a context of a mobile termination (MT) part of the IAB-node;
- a context of a distributed unit (DU) part of the IAB-node;
- a context of a child of the IAB-node; or
- a context of a descendant of the IAB-node.

24. The apparatus of claim 22, wherein the one or more processors are configured, individually or in any combination, to execute the instructions and cause the apparatus to:
- transmit, to the second IAB-donor, acknowledgement (ACK) feedback in response to receiving the information related to the IAB-node.

25. The apparatus of claim 22, wherein traffic information related to the IAB node comprises traffic information related to a mobile termination (MT) part of the IAB-node, a distributed unit (DU) part of the IAB-node, a child of the IAB-node, a descendant of the IAB-node, or any combination thereof.

26. The apparatus of claim 25, wherein the traffic information comprises at least one of:
- quality of service (QoS) information;
- QoS mapping information;
- a backhaul adaptation protocol (BAP) configuration allocated to the IAB-node; or
- an internet protocol (IP) configuration with the first IAB-donor allocated to the IAB-node.

27. The apparatus of claim 20, wherein the first signaling connection comprises a radio resource control (RRC) connection.

28. The apparatus of claim 20, wherein establishing the first signaling connection with the IAB node occurs due to at least one of:
- a migration of the IAB-node caused by a handover (HO) procedure; or
- a migration of the IAB-node caused by a re-establishment procedure initiated by the IAB-node.

29. A method for wireless communication by a first integrated access and backhaul (IAB)-donor, comprising:
- establishing a first signaling connection with an IAB-node;
- receiving an indication from the IAB-node based on the IAB-node establishing a second signaling connection with a second IAB-donor that the IAB-node has the second signaling connection with the second IAB-donor, wherein the second signaling connection is established with the IAB-node due to a migration of the IAB-node caused by a handover (HO) procedure, and wherein the IAB-node is connected to both the first IAB-donor and the second IAB-donor; and
- in response to receiving the indication:
  - transferring, to the second IAB-donor, information related to the IAB-node;
  - re-establishing traffic between the first IAB-donor and the IAB-node via a topology of the second IAB-donor; or
  - any combination thereof.

* * * * *